(12) United States Patent
Kondo et al.

(10) Patent No.: US 9,671,594 B2
(45) Date of Patent: Jun. 6, 2017

(54) IMAGING LENS AND IMAGING APPARATUS

(71) Applicant: FUJIFILM Corporation, Tokyo (JP)

(72) Inventors: Masato Kondo, Saitama (JP); Takashi Suzuki, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 15/186,906

(22) Filed: Jun. 20, 2016

(65) Prior Publication Data

US 2017/0010441 A1    Jan. 12, 2017

(30) Foreign Application Priority Data

Jul. 10, 2015   (JP) .................... 2015-138326

(51) Int. Cl.

| | |
|---|---|
| *G02B 9/14* | (2006.01) |
| *G02B 13/18* | (2006.01) |
| *G02B 3/02* | (2006.01) |
| *G02B 13/00* | (2006.01) |
| *G03B 13/36* | (2006.01) |
| *G02B 27/00* | (2006.01) |

(52) U.S. Cl.
CPC ....... *G02B 13/006* (2013.01); *G02B 13/0045* (2013.01); *G02B 27/0025* (2013.01); *G03B 13/36* (2013.01)

(58) Field of Classification Search
CPC .............. G02B 13/006; G02B 27/0025; G02B 13/0045; G03B 13/36
USPC ................ 359/785, 784, 708, 716, 684, 690
See application file for complete search history.

(56) References Cited

U.S. PATENT DOCUMENTS

| | | | |
|---|---|---|---|
| 2012/0293869 A1 | 11/2012 | Hayashi et al. | |
| 2014/0176782 A1 | 6/2014 | Yokoyama | |
| 2014/0334015 A1* | 11/2014 | Suzuki ................... | G02B 13/02 359/708 |

FOREIGN PATENT DOCUMENTS

| | | |
|---|---|---|
| JP | 2012-242690 A | 12/2012 |
| JP | 2014-089352 A | 5/2014 |
| JP | 2014-123018 A | 7/2014 |

* cited by examiner

*Primary Examiner* — Alicia M Harrington
(74) *Attorney, Agent, or Firm* — Studebaker & Brackett PC

(57) ABSTRACT

An imaging lens is constituted by, in order from the object side to the image side, a positive first lens group, a negative second lens group, and a positive third lens group. During focusing operations, the first lens group and the third lens group are fixed, while the second lens group moves. The first lens group has a cemented lens formed by cementing a positive lens and a negative lens together. The second lens group is constituted by two or fewer lenses. The third lens group is constituted by three or more lenses. The surface toward the object side of at least one of the first and second lenses from the object side within the third lens group is concave. A negative lens having a concave surface toward the object side is provided most toward the image side. A predetermined conditional formula is satisfied.

20 Claims, 15 Drawing Sheets

EXAMPLE 1

FIG.3 EXAMPLE 2
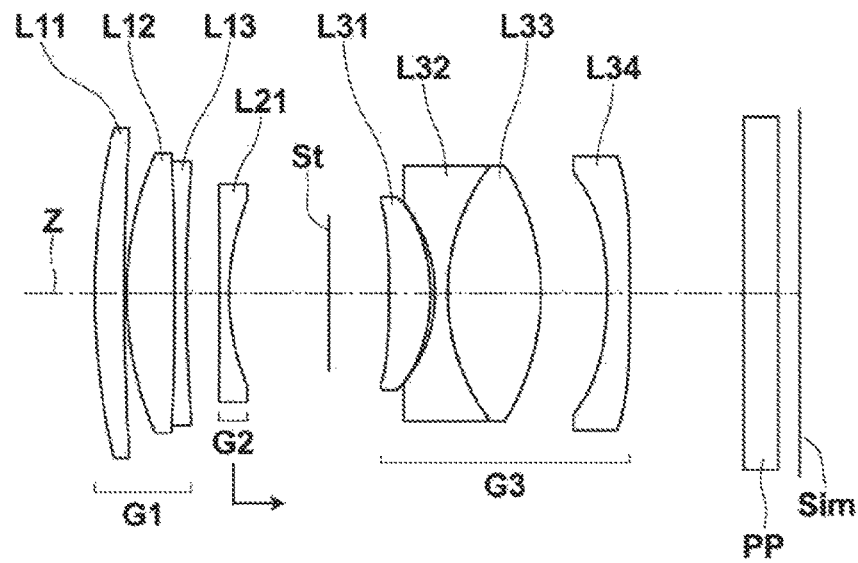
FIG.4 EXAMPLE 3
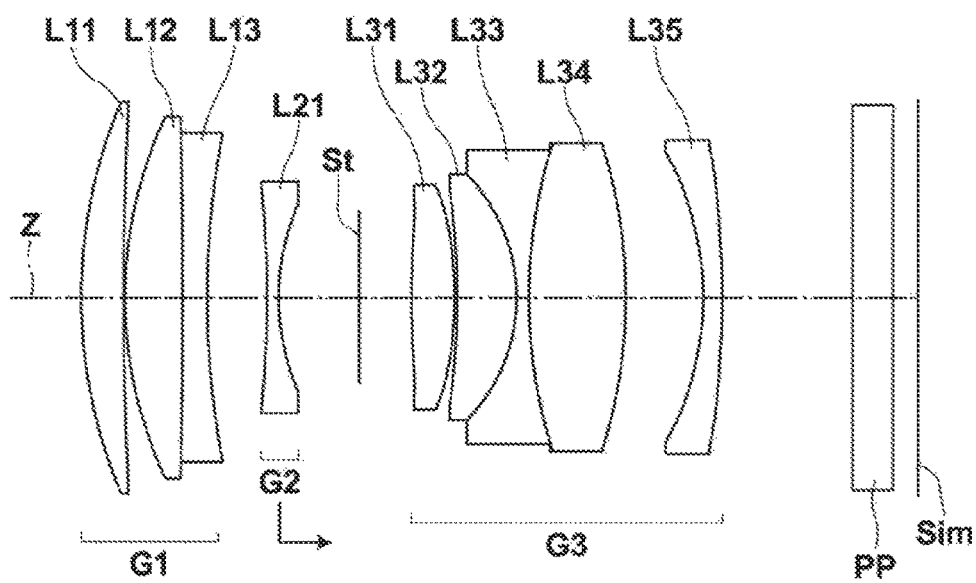

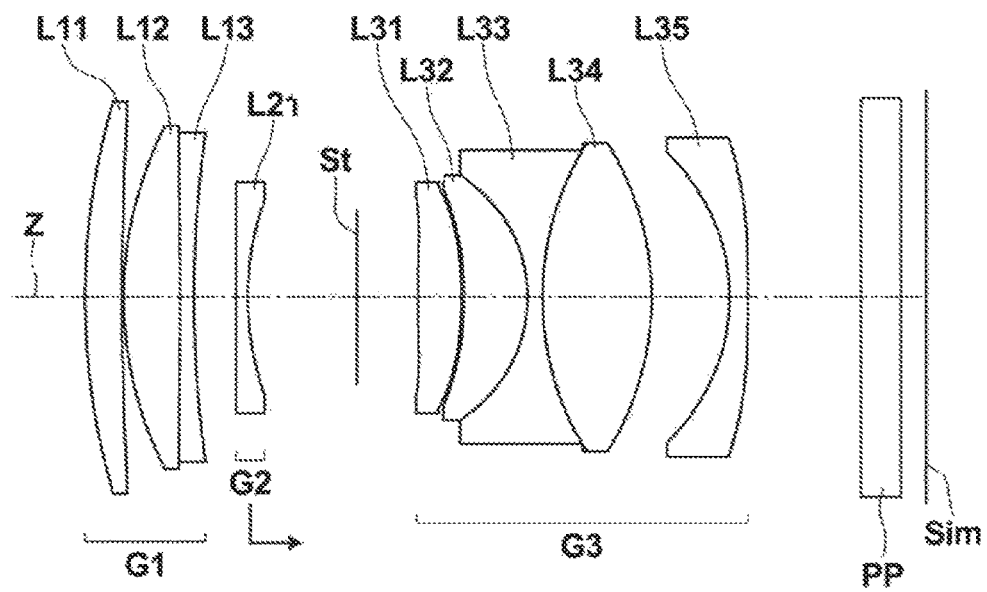
FIG.5  EXAMPLE 4
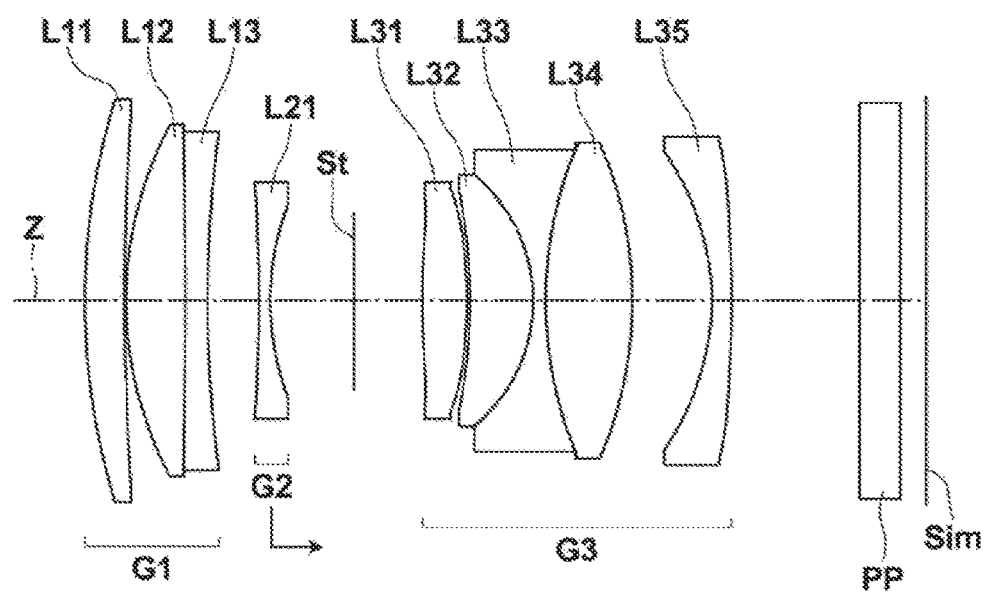
FIG.6  EXAMPLE 5

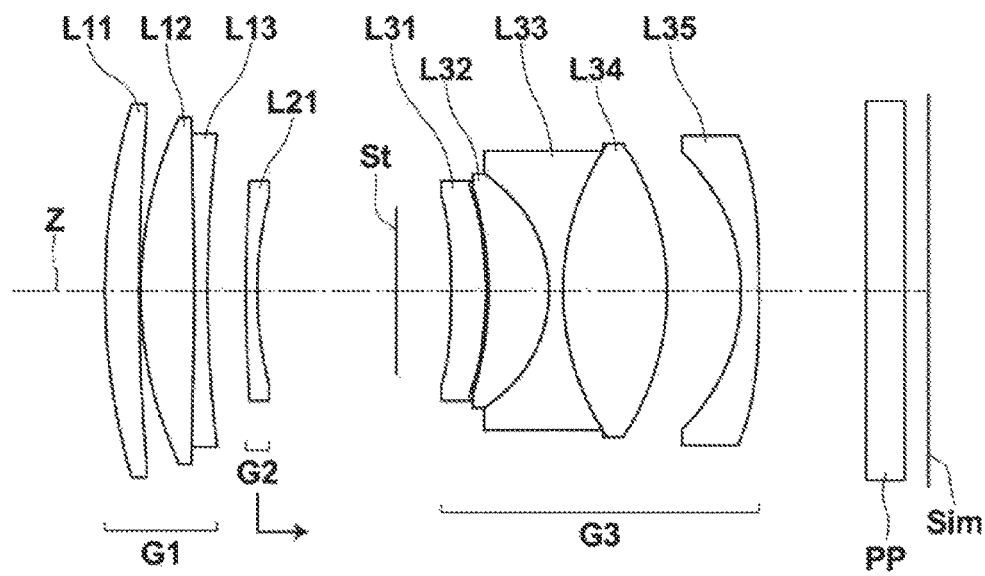
FIG.7  EXAMPLE 6
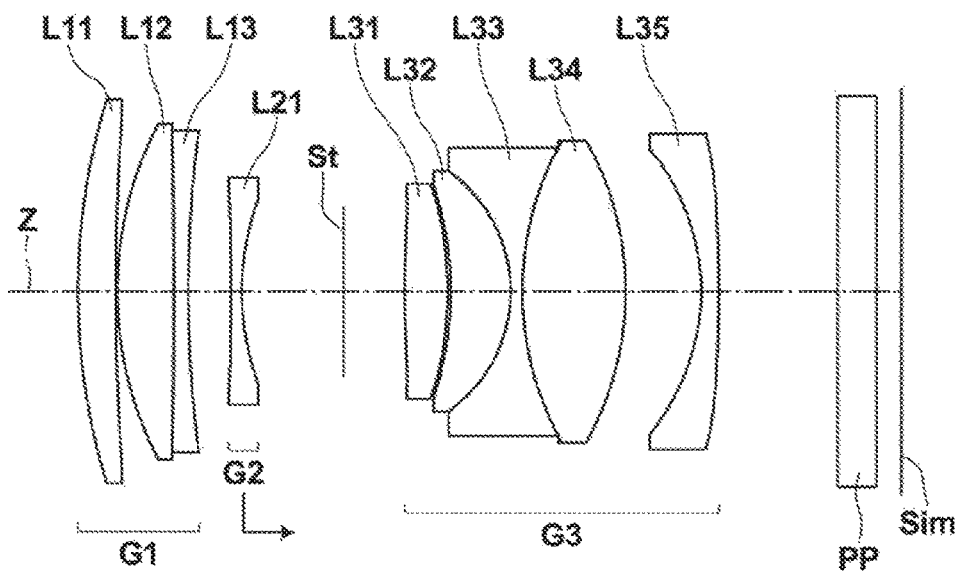
FIG.8  EXAMPLE 7

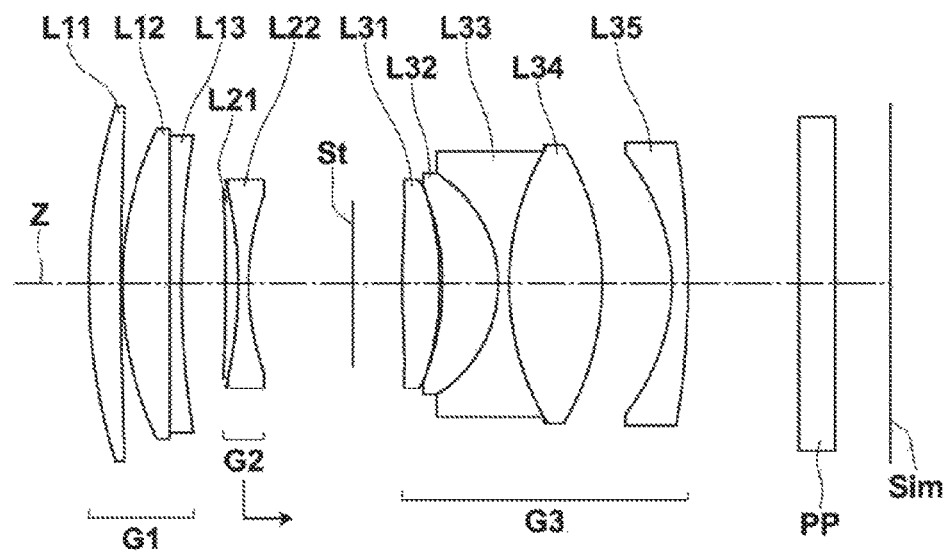
FIG.9 EXAMPLE 8
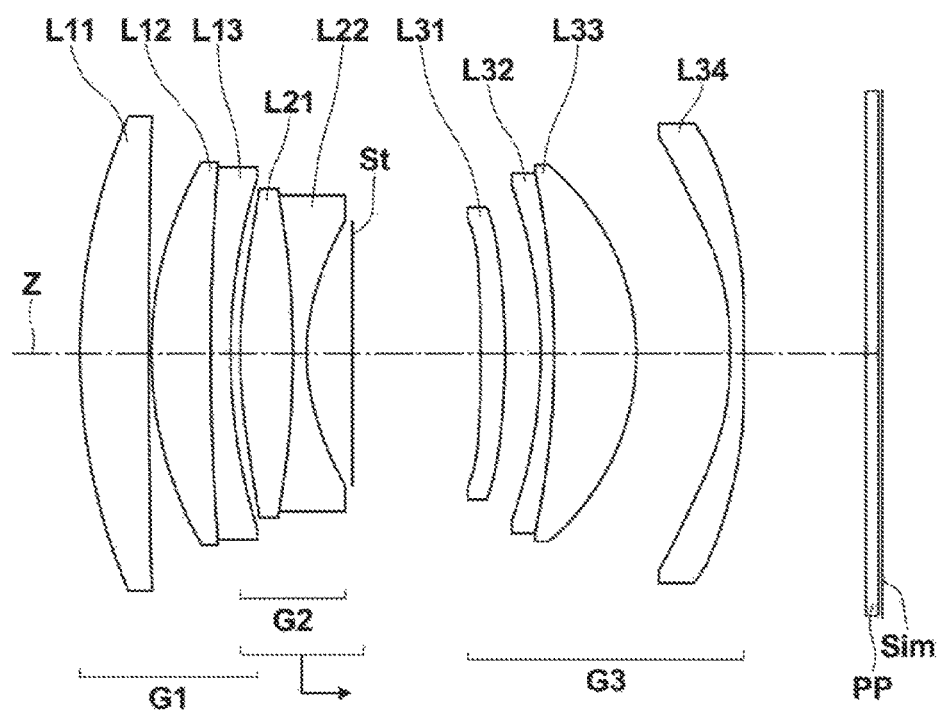
FIG.10 EXAMPLE 9

FIG. 14 EXAMPLE 4

EXAMPLE 7

IMAGING LENS AND IMAGING APPARATUS

CROSS REFERENCE TO RELATED APPLICATIONS

The present application claims priority under 35 U.S.C. §119 to Japanese Patent Application No. 2015-138326 filed on Jul. 10, 2015. The above application is hereby expressly incorporated by reference in its entirety, into the present application.

BACKGROUND

The present disclosure is related to an imaging lens. More particularly, the present disclosure is related to an imaging lens which is favorably suited for use in imaging apparatuses such as digital cameras, video cameras, and the like. In addition, the present disclosure is related to an imaging apparatus equipped with such an imaging lens.

Conventionally, imaging lenses that adopt the inner focus method, in which a portion of lens groups at an intermediate portion of a lens system is moved to perform focusing operations, have been proposed as imaging lenses for use in digital cameras that employ interchangeable lenses. For example, Japanese Unexamined Patent Publication Nos. 2014-123018, 2012-242690, and 2014-089352 disclose lens systems that adopt the inner focus method, equipped with, in order from the object side to the image side, a first lens group having a positive refractive power, a second lens group having a negative refractive power, and a third lens group having a positive refractive power. In these lens systems, the second lens group is moved from the object side to the image side to change focus from that on an object at infinity to that on an object at a proximal distance.

SUMMARY

However, the lens system disclosed in Japanese Unexamined Patent Publication No. 2014-123018 has a long total length with respect to the focal length of the entire system, and does not sufficient meet recent demand for miniaturization. The lens system disclosed in Japanese Unexamined Patent Publication No. 2012-242690 presumes a telephoto lens, and there are cases in which it can be said that the angle of view is not sufficiently wide depending on the desired specifications of a lens system. The lens system disclosed in Japanese Unexamined Patent Publication No. 2014-089352 has a large amount of chromatic aberrations.

In addition, video photography is often performed using digital cameras recently. Therefore, there is great demand for high speed automatic focus control. For this reason, miniaturization and reduction in weight of a lens group that moves during focusing operations (hereinafter, referred to as "focusing lens group") is desired.

The present disclosure has been developed in view of the foregoing circumstances. The present disclosure provides a compact imaging lens having a wide angle of view that adopts the inner focus method, which is capable of high speed automatic focus, favorably corrects chromatic aberrations, and has high optical performance. The present disclosure also provides an imaging apparatus to which this imaging lens is applied.

An imaging lens of the present disclosure consists of, in order from the object side to the image side:
a first lens group having a positive refractive power;
a second lens group having a negative refractive power; and
a third lens group having a positive refractive power;
the first lens group and the third lens group being fixed with respect to an image formation plane and the second lens group moving from the object side to the image side during focusing operations to change focus from that on an object at infinity to that on an object at a proximal distance;
the first lens group having a cemented lens constituted by two lenses, formed by cementing a positive lens and a negative lens together;
the second lens group consisting of two or fewer lenses;
the third lens group consisting of three or more lenses;
the surface toward the object side of at least one of the lens provided most toward the object side within the third lens group and the lens provided second from the object side within the third lens group being concave;
the lens provided most toward the image side within the third lens group being a negative lens having a concave surface toward the object side; and
Conditional Formula (1) below related to at least one cemented lens constituted by two lenses within the first lens group being satisfied:

$$20 < \nu 1p - \nu 1n \tag{1}$$

wherein ν1p is the Abbe's number with respect to the d line of a positive lens within the cemented lens constituted by two lenses, and ν1n is the Abbe's number with respect to the d line of a negative lens within the cemented lens constituted by two lenses.

In the imaging lens of the present disclosure, it is preferable for Conditional Formula (1-1) to be further satisfied within a range that satisfies Conditional Formula (1).

$$23 < \nu 1p - \nu 1n \tag{1-1}$$

In the imaging lens of the present disclosure, it is preferable for the first lens group to have a positive negative cemented lens formed by cementing a positive lens and a negative lens, which are provided in this order from the object side to the image side, together. That is, it is preferable for the order of the powers of the lenses which are cemented together to be positive then negative from the object side to the image side. In this case, it is preferable for the refractive index with respect to the d line of the negative lens within the positive negative cemented lens to be greater than the refractive index with respect to the d line of the positive lens within the positive negative cemented lens.

In the imaging lens of the present disclosure, it is preferable for the third lens group to have a cemented lens formed by cementing at least one positive lens and at least one negative lens together. In this case, it is preferable for Conditional Formula (3) below related to at least one cemented lens within the third lens group to be satisfied:

$$10 < \nu 3p - \nu 3n \tag{3}$$

wherein ν3p is the maximum Abbe's number with respect to the d line of a positive lens within the cemented lens, and ν3n is the minimum Abbe's number with respect to the d line of a negative lens within the cemented lens.

In the imaging lens of the present disclosure, it is preferable for an aperture stop to be positioned between a lens surface most toward the image side within the second lens group and a lens surface most toward the object side within the third lens group.

In the imaging lens of the present disclosure, it is preferable for at least one of Conditional Formulae (2), (4) through (7), (2-1), (4-1), (5-1), and (6-1) below to be satisfied.

$$-1.5 < f/fe < -0.4 \quad (2)$$

$$-1.3 < f/fe < -0.6 \quad (2\text{-}1)$$

$$-3.0 < f/f2 < -0.6 \quad (4)$$

$$-2.2 < f/f2 < -0.6 \quad (4\text{-}1)$$

$$-2.0 < Ra/f3 < -0.3 \quad (5)$$

$$-1.6 < Ra/f3 < -0.3 \quad (5\text{-}1)$$

$$0.9 < f/f1 < 1.4 \quad (6)$$

$$1.0 < f/f1 < 1.3 \quad (6\text{-}1)$$

$$0.2 < Bf/f < 0.5 \quad (7)$$

wherein f is the focal length of the entire lens system in a state focused on an object at infinity, fe is the focal length of the lens provided most toward the image side, f2 is the focal length of the second lens group, Ra is the radius of curvature of the surface toward the image side of the second lens from the image side within the third lens group, f3 is the focal length of the third lens group, f1 is the focal length of the first lens group, and Bf is an air converted distance along the optical axis from the lens surface most toward the image side to an image formation plane.

In the imaging lens of the present disclosure, it is preferable for the surface toward the image side of the lens provided most toward the image side to be of an aspherical shape having a positive refractive power in the vicinity of the optical axis and a stronger positive refractive power at the intersection of a principal light ray at a maximum angle of view and the surface, or to be of an aspherical shape having a negative refractive power in the vicinity of the optical axis and a positive refractive power at the intersection of a principal light ray at a maximum angle of view and the surface.

In the imaging lens of the present disclosure, the first lens group may consist of, in order from the object side to the image side, two positive lenses and one negative lens.

In the imaging lens of the present disclosure, the third lens group may consist of, in order from the object side to the image side, a positive lens, a negative lens, a positive lens, and a negative lens, or may consist of, in order from the object side to the image side, a positive lens, a positive lens, a negative lens, a positive lens, and a negative lens. In these cases, it is preferable for the second and third lenses from the image side within the third lens group to be cemented together.

Note that the phrases "consists of . . . " and "consist of . . . " above refer to essential elements, and mean that constituent elements other than those listed above, such as lenses that substantially do not have any power, optical elements other than lenses such as a stop and a cover glass, and mechanical components such as a lens flange, a lens barrel, and a camera shake correcting mechanism, may also be included.

Note that the phrase "lens group" does not necessarily refer to those constituted by a plurality of lenses, and may include those which are constituted by a single lens.

Note that the signs of the refractive powers of the above lens groups, the signs of the refractive powers of the lenses, the values of the radii of curvature, and the surface shapes of the lenses will be considered in the paraxial region for lenses that include aspherical surfaces. In addition, the signs of the radii of curvature are positive for shapes which are convex toward the object side, and negative for shapes which are convex toward the image side.

An imaging apparatus of the present disclosure is equipped with an imaging lens of the present disclosure.

According to the present disclosure, the configurations of each lens group are favorably set and a predetermined conditional formula is satisfied in a lens system consisting of, in order from the object side to the image side, a positive first lens group, a negative second lens group, and a positive third lens group, in which the first lens group and the third lens group are fixed while the second lens group moves from the object side toward the image side when changing focus from that on an object at infinity to that on an object at a proximal distance. Therefore, a compact imaging lens having a wide angle of view that adopts the inner focus method, which is capable of high speed automatic focus, favorably corrects chromatic aberrations, and has high optical performance can be provided. In addition, an imaging apparatus equipped with this imaging lens can also be provided.

BRIEF DESCRIPTION OF THE DRAWINGS

FIG. 3 is a sectional diagram that illustrates the lens configuration of an imaging lens according to Example 2 of the present disclosure.

FIG. 4 is a sectional diagram that illustrates the lens configuration of an imaging lens according to Example 3 of the present disclosure.

FIG. 5 is a sectional diagram that illustrates the lens configuration of an imaging lens according to Example 4 of the present disclosure.

FIG. 6 is a sectional diagram that illustrates the lens configuration of an imaging lens according to Example 5 of the present disclosure.

FIG. 7 is a sectional diagram that illustrates the lens configuration of an imaging lens according to Example 6 of the present disclosure.

FIG. 8 is a sectional diagram that illustrates the lens configuration of an imaging lens according to Example 7 of the present disclosure.

FIG. 9 is a sectional diagram that illustrates the lens configuration of an imaging lens according to Example 8 of the present disclosure.

FIG. 10 is a sectional diagram that illustrates the lens configuration of an imaging lens according to Example 9 of the present disclosure.

DETAILED DESCRIPTION OF THE PREFERRED EMBODIMENTS

Figure 1:
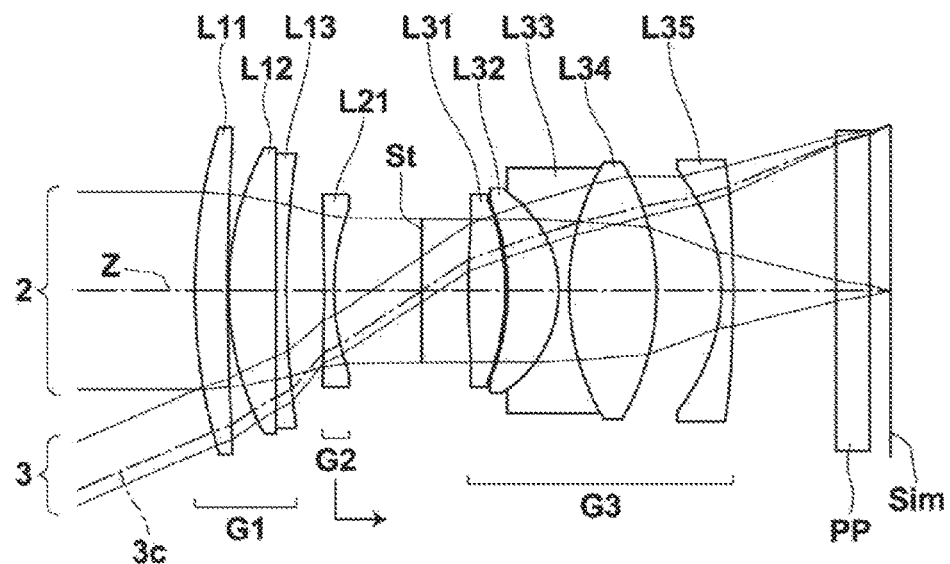
FIG. 1 is a sectional diagram that illustrates the lens configuration of and the paths of light beams that pass through an imaging lens according to an embodiment of the present disclosure.

Hereinafter, embodiments of the present disclosure will be described in detail with reference to the accompanying drawings. FIG. 1 is a sectional diagram that illustrates the lens configuration of and the optical paths of light beams through an imaging lens according to an embodiment of the present disclosure. Note that the example illustrated in FIG. 1 corresponds to a imaging lens according to Example 1 to be described later. In FIG. 1, the left side of the drawing sheet is the object side, and the right side of the drawing sheet is the image side. The illustrated optical paths are those for an axial light beam 2 and an off axis light beam 3 at a maximum angle of view.

This imaging lens is constituted by, along an optical axis Z in order from the object side to the image side: a first lens group G1 having a positive refractive power as a whole, a second lens group G2 having a negative refractive power as a whole, and a third lens group G3 having a positive refractive power as a whole. In the example illustrated in FIG. 1, the first lens group G1 is constituted by three lenses, which are lenses L11 through L13, provided in this order from the object side to the image side. The second lens group G2 is constituted by one lens, which is a lens L21. The third lens group G3 is constituted by five lenses, which are lenses L31 through L35, provided in this order from the object side to the image side. However, it is possible for each of the lens groups to be constituted by a number of lenses that differs from those of the example illustrated in FIG. 1.

In addition, an aperture stop St is provided between the second lens group G2 and the third lens group G3 in the example illustrated in FIG. 1. However, the aperture stop St illustrated in FIG. 1 does not necessarily represent the size or the shape thereof, but the position thereof along the optical axis Z.

Various filters such as a low pass filter and an infrared cutoff filter, as well as a cover glass, etc., may be provided between the imaging lens and an image formation plane Sim or among each of the lenses, depending on the specifications of an imaging apparatus, in the case that the imaging lens is applied to an imaging apparatus. For this reason, FIG. 1 illustrates an example in which a plan parallel plate shaped optical member PP is provided between the lens system and the image formation plane Sim. However, the position of the optical member PP is not limited to that illustrated in FIG. 1. In addition, a configuration from which the optical member PP is omitted is also possible.

In this imaging lens, the second lens group G2 moves from the object side to the image side while the first lens group G1 and the third lens group G3 are fixed with respect to the image formation plane Sim, when changing focus from that on an object at infinity to that on an object at a proximal distance. That is, the imaging lens is a lens system that adopts the inner focus method, in which the second lens group G2 functions as a focusing lens group.

The first lens group G1 being a positive lens group contributes to a shortening of the total length of the lens system, suppresses the heights of axial light rays that enter the second lens group G2, and suppresses the diameter of the second lens group G2 as a whole. Therefore, this configuration contributes to miniaturization and a reduction in weight of the focusing lens group.

The first lens group G1 has at least one cemented lens formed by cementing two lenses together, constituted by two lenses, which are one positive lens and one negative lens cemented, together. At least one of the cemented lenses constituted by two lenses is configured such that Conditional Formula (1) below is satisfied.

$$20 < \nu 1p - \nu 1n \quad (1)$$

wherein $\nu 1p$ is the Abbe's number with respect to the d line of a positive lens within the cemented lens constituted by two lenses, and $\nu 1n$ is the Abbe's number with respect to the d line of a negative lens within the cemented lens constituted by two lenses.

By Conditional Formula (1) being satisfied, favorable correction of longitudinal chromatic aberration and lateral chromatic aberration can be advantageously performed. It is preferable fro Conditional Formula (1-1) below to be satisfied, in order to cause the advantageous effects related to Conditional Formula (1) to become more prominent.

$$23 < \nu 1p - \nu 1n \quad (1\text{-}1)$$

Note that it is preferable for Conditional Formulae (1-2) and (1-3) to be respectively satisfied, in order to obtain the advantageous effects related to Conditional Formulae (1) and (1-1) while suppressing excessive correction of chromatic aberrations.

$$20 < \nu 1p - \nu 1n < 50 \quad (1\text{-}2)$$

$$23 < \nu 1p - \nu 1n < 50 \quad (1\text{-}3)$$

It is preferable for the first lens group to have at least one positive negative cemented lens formed by cementing a positive lens and a negative lens, which are provided in this order from the object side to the image side, together. Setting the order of positive lens and the negative lens within the cemented lens within the first lens group G1 in this manner is advantageous from the viewpoint of correcting longitudinal chromatic aberration and lateral chromatic aberration. This cemented lens having the positive lens and the negative lens in this order may be the cemented lens which satisfies Conditional Formula (1). In this case, favorable correction of longitudinal chromatic aberration and lateral chromatic aberration can be more advantageously performed.

Further, it is preferable for the refractive index with respect to the d line of the negative lens within the positive negative cemented lens to be greater than the refractive index with respect to the d line of the positive lens within the positive negative cemented lens. In the case that this configuration is adopted, it will become possible for axial marginal light rays to be favorably refracted at the coupling surface of the cemented lens. Therefore, chromatic aberrations can be favorably corrected, while spherical aberration can also be advantageously corrected.

It is preferable for the first lens group G1 to be constituted by five or fewer lenses. Adopting this configuration is advantageous from the viewpoint of shortening the total length of the lens system. It is preferable for the first lens group G1 to be constituted by three or fewer lenses, in order to achieve a further shortening of the total length of the lens system. For example, the first lens group G1 may be constituted by, in order from the object side to the image side, two positive lenses and one negative lens. In the case that this configuration is adopted, the refractive power of each of the positive lenses can be prevented from becoming excessively strong, because two positive lenses are employed in the first lens group G1, which is advantageous from the viewpoint of correcting spherical aberration. In addition, employing one negative lens in addition to the two positive lenses is advantageous from the viewpoint of favorably correcting chromatic aberrations.

The second lens group G2 is constituted by two or fewer lenses. By the focusing lens group being constituted by one or two lenses, the weight of the focusing lens group can be reduced, and accelerating automatic focusing operations is facilitated. In addition, the second lens group G2 moving from the object side to the image side when changing focus from that on an object at infinity to that on an object at a proximal distance is advantageous from the viewpoint of decreasing the lens diameter of the second lens group G2, which contributes to miniaturization and weight reduction.

The third lens group G3 is constituted by three or more lenses. The surface toward the object side of at least one of the lens provided most toward the object side within the third lens group G3 and the lens provided second from the object side within the third lens group G3 is configured to be concave. Thereby, the generation of astigmatism can be suppressed, and securing an angle of view is facilitated. In addition, the lens provided most toward the image side within the third lens group G3 is configured to be a negative lens having a concave surface toward the object side. The third lens group G3 having a negative lens is advantageous from the viewpoint of improving the Petzval sum. Providing the negative lens most toward the image side is advantageous from the viewpoint of shortening the total length of the lens system, and further enables distortion to be corrected. By the negative lens provided most toward the image side being a lens having a concave surface toward the object side, astigmatism can be corrected.

It is preferable for the surface toward the image side of the lens provided most toward the image side to be of an aspherical shape having a positive refractive power in the vicinity of the optical axis and a stronger positive refractive power at the intersection of a principal light ray $3c$ at a maximum angle of view and the surface, or to be of an aspherical shape having a negative refractive power in the vicinity of the optical axis and a positive refractive power at the intersection of the principal light ray $3c$ at a maximum angle of view and the surface. Adopting this configuration is advantageous form the viewpoint of favorably correcting astigmatism. It is preferable for both surfaces of the lens provided most toward the image side to be aspherical surfaces, in order to more favorably correct aberrations. In addition, at least one of the surfaces of the lens provided most toward the object side within the third lens group G3 may be configured to be an aspherical surface. Adopting such a configuration is advantageous form the viewpoint of favorably correcting aberrations. Astigmatism and spherical aberration can be favorably corrected, particularly in the case that both of the surfaces of the lens provided most toward the object side within the third lens group G3 are configured to be aspherical surfaces.

In addition, it is preferable for Conditional Formula (2) below to be satisfied with respect to the lens provided most toward the image side.

$$-1.5 < f/fe < -0.4 \qquad (2)$$

wherein f is the focal length of the entire lens system in a state focused on an object at infinity, and fe is the focal length of the lens provided most toward the image side.

By configuring the imaging lens such that the value of f/fe is not less than or equal to the lower limit defined in Conditional Formula (2), suppressing the incident angle of off the principal light rays of off axis light beams into the image formation plane Sim will be facilitated. By configuring the imaging lens such that the value of f/fe is not greater than or equal to the upper limit defined in Conditional Formula (2), an increase in the Petzval sum can be suppressed. As a result, an increase in field curvature can be suppressed. It is more preferable for Conditional Formula (2-1) below to be satisfied, in order to cause the advantageous effects related to Conditional Formula (2) to become more prominent.

$$-1.3 < f/fe < -0.6 \qquad (2-1)$$

It is preferable for the third lens group G3 to have a cemented lens formed by cementing at least one positive lens and at least one negative lens together. In this case, longitudinal chromatic aberration and lateral chromatic aberration can be advantageously corrected. Note that the cemented lens within the third lens group G3 may be a cemented lens constituted by two lenses or a cemented lens constituted by three lenses. It is preferable for Conditional Formula (3) below to be satisfied with respect to the cemented lens within the third lens group G3 to be satisfied, $$10 < v3p - v3n \qquad (3)$$

wherein v3p is the maximum Abbe's number with respect to the d line of a positive lens within the cemented lens, and v3n is the minimum Abbe's number with respect to the d line of a negative lens within the cemented lens.

By Conditional Formula (3) being satisfied, longitudinal chromatic aberration and lateral chromatic aberration can be advantageously corrected. Note that it is preferable for Conditional Formula (3-1) below to be satisfied, in order to obtain the advantageous effects related to Conditional Formula (3) while suppressing excessive correction of chromatic aberrations.

$$10 < v3p - v3n < 50 \tag{3-1}$$

It is preferable for the third lens group G3 to be constituted by seven or fewer lenses. Adopting such a configuration is advantageous from the viewpoint of shortening the total length of the lens system. It is preferable for the third lens group G3 to be constituted by five or fewer lenses, in order to achieve a further shortening of the total length of the lens system. Specifically, for example, the third lens group G3 may be of a four lens configuration constituted by, in order from the object side to the image side, a positive lens, a negative lens, a positive lens, and a negative lens. Alternatively, the third lens group G3 may be of a five lens configuration constituted by, in order from the object side to the image side, a positive lens, a positive lens, a negative lens, a positive lens, and a negative lens. In the four lens configuration and the five lens configuration above, it is preferable for the second and third lenses from the image side within the third lens group G3 to be cemented together. In the case that such a configuration is adopted, the cemented lens can favorably correct longitudinal chromatic aberration and lateral chromatic aberration, while favorably improving the Petzval sum, correcting distortion, and correcting spherical aberration. Further, the total length of the lens system can be shortened. Note that in the third lens group having the four lens configuration described above, the first and second lenses from the object side may or may not be cemented together. In addition, in the third lens group having the five lens configuration described above, the second and third lenses from the object side may or may not be cemented together.

It is preferable for the aperture stop St to be positioned between a lens surface most toward the image side within the second lens group G2 and a lens surface most toward the object side within the third lens group G3. In this case, the symmetry of the optical system with respect to the aperture stop St will be improved compared to a case in which the aperture stop St is positioned at the object side of the second lens group G2 or a case in which the aperture stop St is positioned within the third lens group G3. As a result, favorably correction, particularly of lateral chromatic aberration, will become possible.

In addition, it is preferable for at least one of Conditional Formulae (4) through (7) below to be satisfied in this imaging lens.

$$-3.0 < f/f2 < -0.6 \tag{4}$$

$$-2.0 < Ra/f3 < -0.3 \tag{5}$$

$$0.9 < f/f1 < 1.4 \tag{6}$$

$$0.2 < Bf/f < 0.5 \tag{7}$$

wherein f is the focal length of the entire lens system in a state focused on an object at infinity, f2 is the focal length of the second lens group, Ra is the radius of curvature of the surface toward the image side of the second lens from the image side within the third lens group, f3 is the focal length of the third lens group, f1 is the focal length of the first lens group, and Bf is an air converted distance along the optical axis from the lens surface most toward the image side to an image formation plane.

By configuring the imaging lens such that the value of f/f2 is not less than or equal to the lower limit defined in Conditional Formula (4), the amount of movement of the second lens group G2 during focusing operations can be decreased. As a result, the amount of time required for automatic focusing operations can be reduced, and increasing the speed of automatic focusing operations can be facilitated. In addition, configuring the imaging lens such that the value of f/f2 is not less than or equal to the lower limit defined in Conditional Formula (4) will facilitate securing of space for providing mechanical components at the object side and at the image side of the second lens group G2. By configuring the imaging lens such that the value of f/f2 is not greater than or equal to the upper limit defined in Conditional Formula (4), the refractive power of the second lens group G2 can be prevented from becoming excessively strong. As a result, fluctuations in spherical aberration, astigmatism, and chromatic aberrations caused by focusing operations can be suppressed, and obtaining favorable optical performance in a state focused on an object at a proximal distance will be facilitated.

It is more preferable for Conditional Formula (4-1) below to be satisfied, in order to cause the advantageous effects related to the lower limit of Conditional Formula (4) to become more prominent, while obtaining the advantageous effects related to the upper limit of Conditional Formula (4).

$$-2.2 < f/f2 < -0.6 \tag{4-1}$$

By configuring the imaging lens such that the value of Ra/f3 is not less than or equal to the lower limit defined in Conditional Formula (5), spherical aberration being insufficiently corrected can be prevented. By configuring the imaging lens such that the value of Ra/f3 is not greater than or equal to the upper limit defined in Conditional Formula (5) spherical aberration being excessively corrected can be prevented. It is more preferable for Conditional Formula (5-1) below to be satisfied, in order to cause the advantageous effects related to the lower limit of Conditional Formula (5) to become more prominent, while obtaining the advantageous effects related to the upper limit of Conditional Formula (5).

$$-1.6 < Ra/f3 < -0.3 \tag{5-1}$$

By configuring the imaging lens such that the value of f/f1 is not less than or equal to the lower limit defined in Conditional Formula (6), the positive refractive power of the first lens group G1 can be prevented from becoming insufficient. As a result, an increase in the total length of the lens system can be suppressed. By configuring the imaging lens such that the value of f/f1 is not greater than or equal to the upper limit defined in Conditional Formula (6), the positive refractive power of the first lens group G1 can be prevented from becoming excessively strong. As a result, suppressing spherical aberration and astigmatism will be facilitated. It is more preferable for Conditional Formula (6-1) below to be satisfied, in order to cause the advantageous effects related to Conditional Formula (6) to become more prominent.

$$1.0 < f/f1 < 1.3 \tag{6-1}$$

By configuring the imaging lens such that the value of Bf/f is not less than or equal to the lower limit defined in Conditional Formula (7), obtaining a necessary amount of back focus in an interchangeable lens for a camera will be facilitated. By configuring the imaging lens such that the value of Bf/f is not greater than or equal to the upper limit defined in Conditional Formula (7), an increase in the total length of the lens system can be suppressed.

Arbitrary combinations of the preferred configurations and possible configurations described above, including the configurations related to the conditional formulae, are possible. It is preferable for these configurations to be adopted according to desired specifications. An imaging lens that adopts the inner focus method which is compact, has a wide angle of view, enables high speed focusing operations, favorably corrects chromatic aberrations, and has high optical performance can be realized by appropriately adopting the configurations described above, for example. Note that here, "compact" refers to an imaging lens having a ratio TL/f of less than 1.7, in the case that f is the focal length of the entire lens system and TL is the total length of the lens system (the distance along the optical axis from the lens provided most toward the object side to the image formation plane, in the case that the portion corresponding to back focus is an air converted length). In addition, here, a "wide angle of view" refers to a full angle of view of 35° or greater.

Next, examples of the numerical values of the imaging lens of the present disclosure will be described.

Example 1

Figure 2:
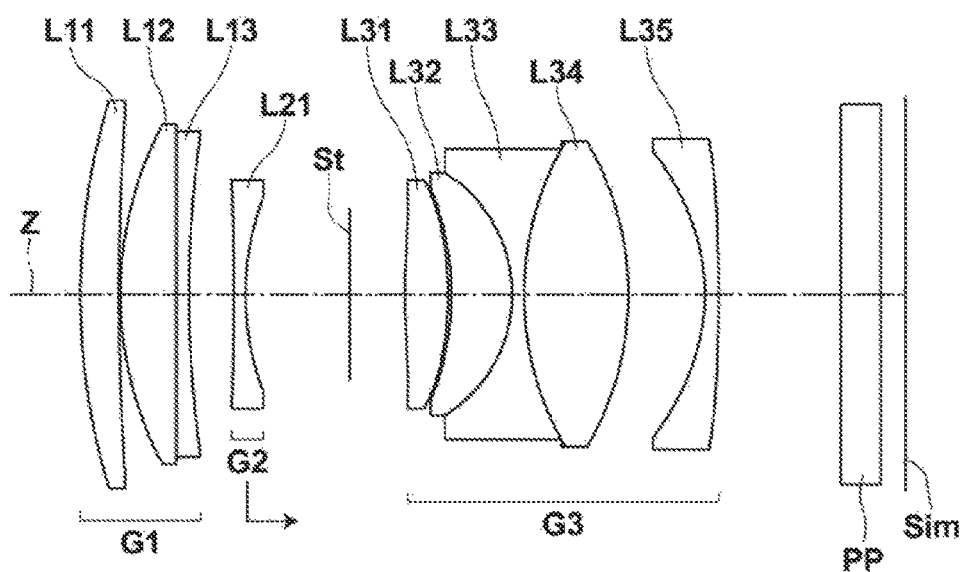
FIG. 2 is a sectional diagram that illustrates the lens configuration of an imaging lens according to Example 1 of the present disclosure.

The lens configuration of an imaging lens of Example 1 is illustrated in FIG. 2. The imaging lens of Example 1 is of a three group configuration constituted by, in order from the object side to the image side, a first lens group G1 having a positive refractive power, a second lens group G2 having a negative refractive power, an aperture stop St, and a third lens group G3 having a positive refractive power. When changing focus from that on an object at infinity to that on an object at a proximal distance, the first lens group G1, the aperture stop St and the third lens group G3 are fixed with respect to the image formation plane Sim, while the second lens group G2 moves from the object side to the image side. Note that the aperture stop St illustrated in FIG. 2 does not necessary represent the size or shape of the aperture stop St, but the position of the aperture stop along an optical axis Z.

In the imaging lens of Example 1, the first lens group G1 is constituted by three lenses, which are, in order from the object side to the image side, lenses L11 through L13. The second lens group G2 is constituted by one lens, which is a lens L21. The third lens group G3 is constituted by five lenses, which are, in order from the object side to the image side, lenses L31 through L35.

Table 1 shows basic lens data of the imaging lens of Example 1. Table 2 shows aspherical surface coefficients of the imaging lens of Example 1. In Table 1, ith (i=1, 2, 3, ... ) lens surface numbers that sequentially increase from the object side to the image side, with the surface toward the object side of the constituent element at the most object side designated as first, are shown in the column Si. The radii of curvature of ith surfaces are shown in the column Ri. The distances between an ith surface and an i+1st surface along the optical axis Z are shown in the column Di. The refractive indices with respect to the d line (wavelength: 587.6 nm) of jth (j=1, 2, 3, ... ) constituent elements that sequentially increase from the object side to the image side, with the constituent element at the most object side designated as first, are shown in the column Ndj. The Abbe's numbers with respect to the d line of jth constituent elements are shown in the column vdj.

Here, the signs of the radii of curvature are positive in cases that the surface shape is convex toward the object side, and negative in cases that the surface shape is convex toward the image side. Table 1 also shows the aperture stop St and the optical member PP. Text reading "(St)" is shown in the row of the surface number for the surface corresponding to the aperture stop St. The value in the lowermost row of column Di is the distance between the surface most toward the image side within the table and the image formation plane Sim. Note that the values shown in Table 1 are those for a state in which the imaging lens is focused on an object at infinity.

The focal length f of the entire lens system in a state focused on an object at infinity, the F number F No., and a maximum full angle of view 2ω with respect to the d line are shown above the frame of Table 1.

In Table 1, the surface numbers of aspherical surfaces are denoted with the mark "*", and the radii of curvature of paraxial regions are shown as the radii of curvature of the aspherical surfaces. Table 2 shows aspherical surface coefficients for each aspherical surface of the imaging lens of Example 1. In the numerical values of the aspherical surface coefficients of Table 2, "E-n (n: integer)" means "·10$^{-n}$". Note that the aspherical surface coefficients are the values of the coefficients KA and Am (m=3, 4, 5, ... , 20) in the following aspherical surface formula:

$$Zd = C \cdot h^2 / 1 + (1 - KA \cdot C^2 \cdot h^2)^{1/2} + \sum Am \cdot h^m \quad [\text{Formula 1}]$$

wherein: Zd is the depth of the aspherical surface (the length of a normal line that extends from a point on the aspherical surface having a height h to a plane perpendicular to the optical axis that contacts the peak of the aspherical surface), h is the height (the distance from the optical axis to the surface of the lens), C is the paraxial curvature, and KA and Am are aspherical surface coefficients (m=3, 4, 5, ... , 20).

In the data of the tables, degrees are employed as the units of angles, and mm are employed as units of length. However, it is possible to utilize optical systems even if they are proportionately enlarged or proportionately reduced in size. Therefore, other appropriate units may be employed, In addition, the numerical values shown in the tables below are those which are rounded off at a predetermined number of digits.

TABLE 1

Example 1
f = 35.328, F No. = 2.09, 2ω = 47.2°

| Si | Ri | Di | Ndj | vdj |
|---|---|---|---|---|
| 1 | 48.07692 | 2.794 | 1.88300 | 40.76 |
| 2 | 192.30769 | 0.100 | | |
| 3 | 26.31582 | 4.010 | 1.75500 | 52.32 |
| 4 | ∞ | 0.925 | 1.89286 | 20.36 |
| 5 | 82.50135 | 3.214 | | |
| 6 | −249.99982 | 0.850 | 1.75500 | 52.32 |
| 7 | 19.88862 | 7.498 | | |
| 8 (St) | ∞ | 3.994 | | |
| *9 | 62.31229 | 3.125 | 1.61881 | 63.85 |
| *10 | −21.92593 | 0.225 | | |
| 11 | −20.27815 | 4.385 | 1.77250 | 49.60 |
| 12 | −10.33058 | 0.860 | 1.60342 | 38.03 |
| 13 | 21.89752 | 7.500 | 1.77250 | 49.60 |
| 14 | −21.89752 | 5.519 | | |
| *15 | −14.20456 | 1.000 | 1.51633 | 64.06 |
| *16 | −96.37645 | 8.806 | | |
| 17 | ∞ | 2.850 | 1.51680 | 64.20 |
| 18 | ∞ | 1.787 | | |

TABLE 2

Example 1

| Surface Number | 9 | 10 | 15 | 16 |
|---|---|---|---|---|
| KA | −4.7486860E−02 | 4.5992067E−01 | −1.6703883E+00 | 1.0635854E+01 |
| A3 | −1.2643757E−18 | −1.6447749E−18 | −1.9493628E−18 | −3.1677145E−18 |
| A4 | 1.0564294E−04 | 1.3648227E−04 | −2.5784133E−04 | −1.1573006E−05 |
| A5 | −8.4672574E−05 | −1.8257331E−05 | 2.7063703E−04 | 6.7399444E−05 |
| A6 | −4.0381816E−05 | −1.4750820E−04 | −1.1145518E−04 | −2.2887143E−05 |
| A7 | 5.4863043E−05 | 1.3195012E−04 | 1.3088266E−05 | 2.1959363E−08 |
| A8 | −1.8547523E−05 | −4.3615873E−05 | 2.9935319E−06 | 9.7674734E−07 |
| A9 | 7.1905820E−07 | 2.5433238E−06 | −8.8653080E−07 | −3.6780866E−08 |
| A10 | 1.0273073E−06 | 1.9712984E−06 | 7.4602330E−09 | −3.5471268E−08 |
| A11 | −2.3209720E−07 | −3.9405286E−07 | 1.8805990E−08 | 3.4858475E−09 |
| A12 | 2.3251601E−10 | −2.7267968E−08 | −1.4435222E−09 | 5.0526237E−10 |
| A13 | 6.8269048E−09 | 1.3302317E−08 | −1.6166265E−10 | −7.5632002E−11 |
| A14 | −9.6610366E−10 | −2.2666307E−10 | 2.3633018E−11 | −2.8646816E−12 |
| A15 | −1.0773615E−11 | −2.2810661E−10 | 8.1185882E−14 | 7.4736294E−13 |
| A16 | 1.8361819E−11 | 1.2408051E−11 | −1.4708308E−13 | −5.0468383E−16 |
| A17 | −1.8742420E−12 | 2.0954425E−12 | 6.7434567E−15 | −3.7482823E−15 |
| A18 | −3.8276515E−14 | −1.6023253E−13 | 1.9896264E−16 | 8.0823827E−17 |
| A19 | 1.8367620E−14 | −8.2114964E−15 | −2.8464253E−17 | 7.8330549E−18 |
| A20 | −9.0677432E−16 | 7.4848161E−16 | 8.5380389E−19 | −2.7827820E−19 |

Figure 11:
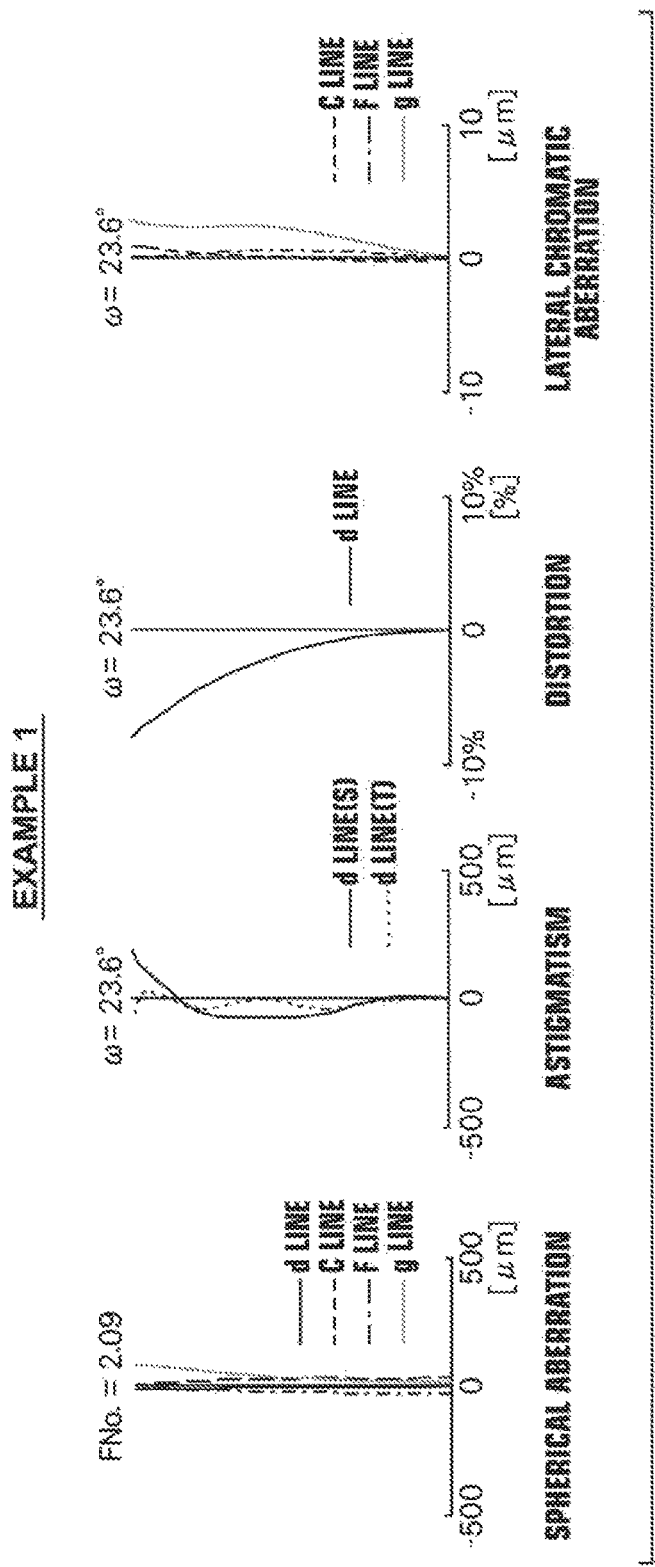
FIG. 11 is a collection of diagrams that illustrate various aberrations of the imaging lens according to Example 1, which are spherical aberration, astigmatism, distortion, and lateral chromatic aberration in this order from the left side of the drawing sheet.

Diagrams that illustrate various aberrations of the imaging lens of Example 1 are illustrated in FIG. 11. FIG. 11 illustrates diagrams for spherical aberration, astigmatism, distortion, and lateral chromatic aberration (chromatic aberration of magnification) in a state focused on an object at infinity from the left to the right of the drawing sheet. The diagrams that illustrate spherical aberration show aberrations related to the d line (wavelength: 587.6 nm), aberrations related to the C line (wavelength: 656.3 nm), aberrations related to the F line (wavelength: 486.1 nm), and aberrations related to the g line (wavelength: 435.8 nm) as black solid lines, long broken lines, dot and dash lines, and gray solid lines, respectively. In the diagrams that illustrate astigmatism, aberrations related to the d line in the sagittal direction are indicated by solid lines, while aberrations related to the d line in the tangential direction are indicated by short broken lines. In the diagrams that illustrate distortion, aberrations related to the d line are shown by solid lines. In the diagrams that illustrate lateral chromatic aberration, aberrations related to the C line, aberrations related to the F line, and aberrations related to the g line are shown as long broken lines, dot and dash lines, and gray solid lines, respectively. Note that in the diagrams that illustrate spherical aberrations, "FNo." denotes F values. In the other diagrams that illustrate the aberrations, "ω" denotes half angles of view.

The symbols, meanings, and the manners in which each item of data is shown in the description of Example 1 apply to the other Examples unless particularly noted. Therefore, redundant descriptions will be omitted hereinbelow.

Example 2

Figure 12:
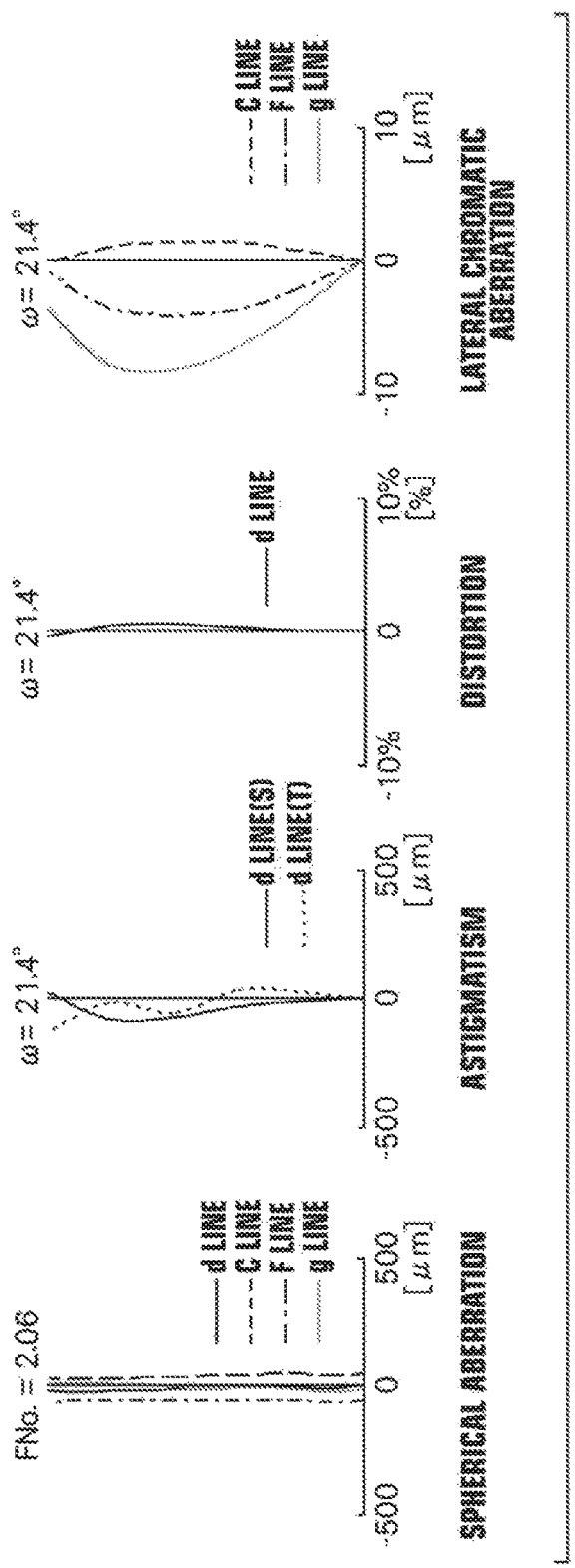
FIG. 12 is a collection of diagrams that illustrate various aberrations of the imaging lens according to Example 2, which are spherical aberration, astigmatism, distortion, and lateral chromatic aberration in this order from the left side of the drawing sheet.

The lens configuration of an imaging lens of Example 2 is illustrated in FIG. 3. In the imaging lens of Example 2, the configuration of lens groups, the constituent element that moves during focusing operations, and the direction of movement thereof are the same as those of Example 1. In the imaging lens of Example 2, the first lens group G1 is constituted by three lenses, which are, in order from the object side to the image side, lenses L11 through L13. The second lens group G2 is constituted by one lens, which is a lens L21. The third lens group G3 is constituted by four lenses, which are, in order from the object side to the image side, lenses L31 through L34. Table 3 shows basic lens data of the imaging lens of Example 2. Table 4 shows aspherical surface coefficients of the imaging lens of Example 2. Diagrams that illustrate various aberrations of the imaging lens of Example 2 in a state focused on an object at infinity are illustrated in FIG. 12.

TABLE 3

Example 2
f = 36.431, F No. = 2.06, 2ω = 44.2°

| Si | Ri | Di | Ndj | vdj |
|---|---|---|---|---|
| 1 | 53.85025 | 2.500 | 1.81600 | 46.62 |
| 2 | 211.65751 | 0.200 | | |
| 3 | 27.76456 | 4.010 | 1.81600 | 46.62 |
| 4 | −231.53413 | 0.950 | 1.95906 | 17.47 |
| 5 | 123.04063 | 2.767 | | |
| 6 | −596.52270 | 0.786 | 1.59282 | 68.62 |
| 7 | 19.07380 | 8.280 | | |
| 8 (St) | ∞ | 5.038 | | |
| *9 | −78.78514 | 3.500 | 1.85400 | 40.39 |
| *10 | −13.91031 | 0.386 | | |
| 11 | −11.36364 | 1.060 | 1.64769 | 33.79 |
| 12 | 16.66668 | 7.750 | 1.78800 | 47.37 |
| 13 | −19.04685 | 5.517 | | |
| *14 | −26.03384 | 1.875 | 1.51633 | 64.06 |
| *15 | −249.98924 | 9.519 | | |
| 16 | ∞ | 2.850 | 1.51680 | 64.20 |
| 17 | ∞ | 1.816 | | |

TABLE 4

Example 2

| | Surface Number | | | |
|---|---|---|---|---|
| | 9 | 10 | 14 | 15 |
| KA | −4.7486860E−02 | 4.5992067E−01 | −1.6703883E+00 | 1.0635854E+01 |
| A3 | 3.5253233E−20 | 1.5648004E−19 | −1.7347235E−19 | 2.9970387E−19 |
| A4 | 4.6724953E−06 | −4.4284786E−05 | −1.3291234E−04 | −2.2507980E−04 |
| A5 | −9.4579745E−05 | −2.8925792E−05 | 4.0047196E−05 | 2.0762828E−04 |
| A6 | 4.5349592E−05 | 6.6823059E−06 | −7.8968569E−07 | −7.2302374E−05 |
| A7 | −3.5541320E−06 | 3.2422831E−06 | −6.3846508E−06 | 6.0596280E−06 |
| A8 | −3.5528516E−06 | −1.8905913E−06 | 1.4853489E−06 | 1.8663432E−06 |
| A9 | 7.0832055E−07 | 8.5372997E−08 | 1.0922716E−07 | −3.6887200E−07 |
| A10 | 1.6911617E−07 | 1.1070417E−07 | −6.8627656E−08 | −1.7168511E−08 |
| A11 | −5.2776138E−08 | −1.6389017E−08 | 2.7332909E−09 | 7.9319785E−09 |
| A12 | −3.6698698E−09 | −2.8771602E−09 | 1.3275343E−09 | −8.4980110E−11 |
| A13 | 2.1140606E−09 | 7.0680329E−10 | −1.2309330E−10 | −9.3022625E−11 |
| A14 | −2.5006965E−11 | 2.5850819E−11 | −1.1852720E−11 | 3.4230520E−12 |
| A15 | −4.4048952E−11 | −1.4431725E−11 | 1.7878821E−12 | 6.3384205E−13 |
| A16 | 2.5043998E−12 | 2.7558350E−13 | 2.9403651E−14 | −3.2651552E−14 |
| A17 | 4.2447155E−13 | 1.4262703E−13 | −1.1870394E−14 | −2.3966426E−15 |
| A18 | −3.6239901E−14 | −6.8629882E−15 | 2.2139943E−16 | 1.4555340E−16 |
| A19 | −1.3083724E−15 | −5.4848465E−16 | 3.0478916E−17 | 3.9452245E−18 |
| A20 | 1.4275599E−16 | 3.5772464E−17 | −1.1724516E−18 | −2.6367377E−19 |

Example 3

Figure 13:
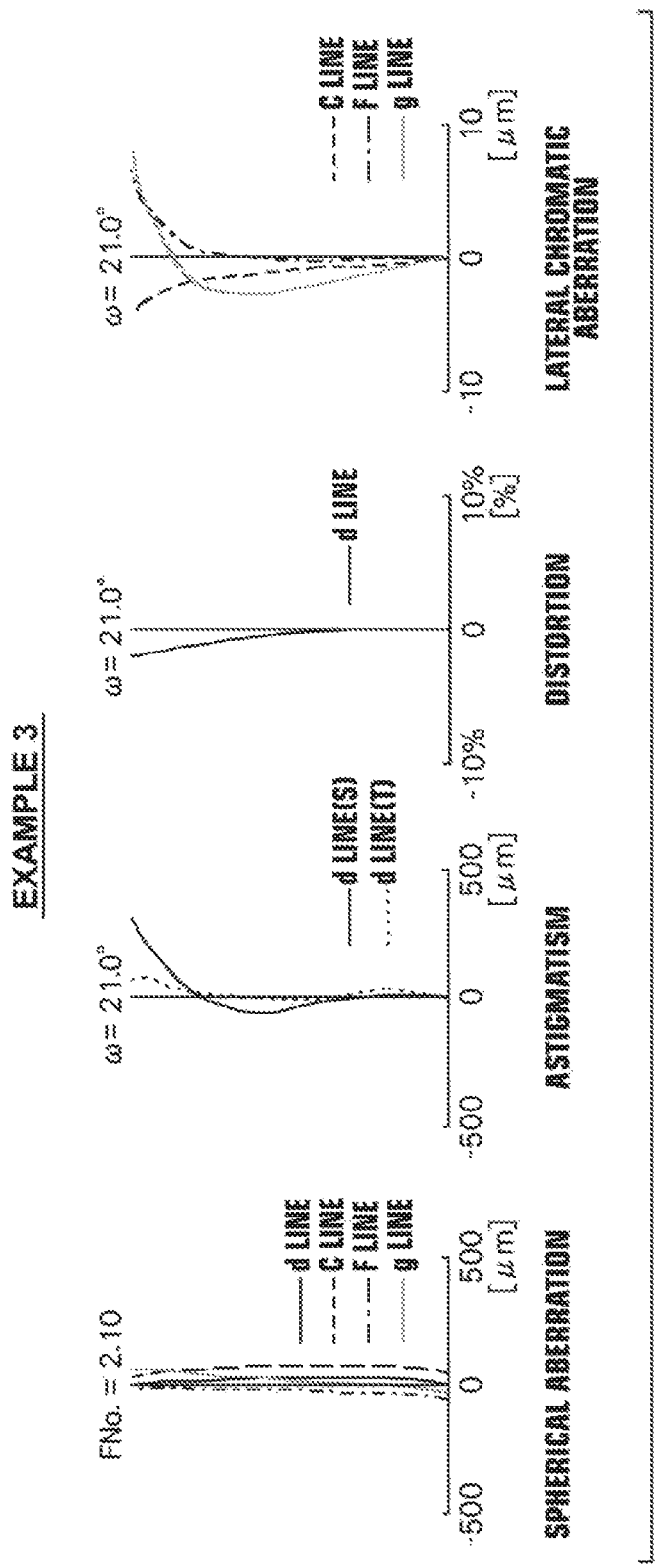
FIG. 13 is a collection of diagrams that illustrate various aberrations of the imaging lens according to Example 3, which are spherical aberration, astigmatism, distortion, and lateral chromatic aberration in this order from the left side of the drawing sheet.

The lens configuration of an imaging lens of Example 3 is illustrated in FIG. 4. In the imaging lens of Example 3, the configuration of lens groups, the constituent element that moves during focusing operations, and the direction of movement thereof are the same as those of Example 1. In the imaging lens of Example 3, the first lens group G1 is constituted by three lenses, which are, in order from the object side to the image side, lenses L11 through L13. The second lens group G2 is constituted by one lens, which is a lens L21. The third lens group G3 is constituted by five lenses, which are, in order from the object side to the image side, lenses L31 through L35. Table 5 shows basic lens data of the imaging lens of Example 3. Table 6 shows aspherical surface coefficients of the imaging lens of Example 3. Diagrams that illustrate various aberrations of the imaging lens of Example 3 in a state focused on an object at infinity are illustrated in FIG. 13.

TABLE 5

Example 3
f = 37.710, F No = 2.10, 2ω = 42.0°

| Si | Ri | Di | Ndj | vdj |
|---|---|---|---|---|
| 1 | 35.97790 | 3.000 | 1.88300 | 40.76 |
| 2 | 258.33611 | 0.100 | | |

TABLE 5-continued

Example 3
f = 37.710, F No = 2.10, 2ω = 42.0°

| Si | Ri | Di | Ndj | vdj |
|---|---|---|---|---|
| 3 | 29.92078 | 4.135 | 1.75500 | 52.32 |
| 4 | −609.75609 | 1.750 | 1.89286 | 20.36 |
| 5 | 62.70949 | 4.253 | | |
| 6 | −78.01548 | 0.825 | 1.75500 | 52.32 |
| 7 | 16.66677 | 5.719 | | |
| 8 (St) | ∞ | 3.725 | | |
| *9 | 59.05594 | 3.120 | 1.61881 | 63.85 |
| *10 | −28.66738 | 0.182 | | |
| 11 | −55.44640 | 4.231 | 1.77250 | 49.60 |
| 12 | −12.58094 | 0.875 | 1.60342 | 38.03 |
| 13 | 36.54963 | 6.876 | 1.77250 | 49.60 |
| 14 | −36.54963 | 5.525 | | |
| *15 | −17.38976 | 1.350 | 1.51633 | 64.06 |
| *16 | −40.56295 | 9.316 | | |
| 17 | ∞ | 2.850 | 1.51680 | 64.20 |
| 18 | ∞ | 1.788 | | |

TABLE 6

Example 3

| | Surface Number | | | |
|---|---|---|---|---|
| | 9 | 10 | 15 | 16 |
| KA | −4.7486860E−02 | 4.5992067E−01 | −1.6703883E+00 | 1.0635854E+01 |
| A3 | 1.9420811E−18 | 1.1842379E−17 | −9.9807375E−18 | −5.9260629E−18 |
| A4 | −1.6260164E−04 | −9.3380076E−05 | 1.1193492E−04 | 2.9994874E−04 |
| A5 | 2.3250117E−04 | 2.6421332E−04 | 1.7757966E−04 | 3.4229645E−05 |
| A6 | −1.6085217E−04 | −2.8399625E−04 | −9.5226683E−05 | −4.0292692E−05 |
| A7 | 4.6836802E−05 | 1.4335761E−04 | 1.3622790E−05 | 9.5100563E−06 |
| A8 | −2.6857015E−06 | −3.2683765E−05 | 2.0095618E−06 | −4.3220804E−07 |
| A9 | −1.2428891E−06 | −1.9633435E−07 | −7.5529448E−07 | −1.9997781E−07 |
| A10 | 1.6311463E−07 | 1.6640006E−06 | 2.4097342E−08 | 3.2600777E−08 |

TABLE 6-continued

Example 3

| | Surface Number | | | |
|---|---|---|---|---|
| | 9 | 10 | 15 | 16 |
| A11 | −3.2701609E−08 | −2.3489074E−07 | 1.3886047E−08 | 5.8047746E−10 |
| A12 | 2.1598588E−08 | −2.8093919E−08 | −1.4439522E−09 | −5.9616513E−10 |
| A13 | −1.7189943E−09 | 8.6436570E−09 | −8.0324917E−11 | 4.3217369E−11 |
| A14 | −1.0528507E−09 | 2.8134197E−11 | 2.0151466E−11 | 3.9792703E−12 |
| A15 | 1.8221999E−10 | −1.5280705E−10 | −6.3095537E−13 | −7.0180357E−13 |
| A16 | 1.1312345E−11 | 6.1642882E−12 | −1.0058620E−13 | 5.1251512E−15 |
| A17 | −4.1240219E−12 | 1.4546347E−12 | 9.9629019E−15 | 4.1710899E−15 |
| A18 | 1.0545025E−13 | −9.4976464E−14 | −5.6946734E−17 | −1.6285712E−16 |
| A19 | 2.9054380E−14 | −5.9678121E−15 | −3.4393417E−17 | −8.7396834E−18 |
| A20 | −1.7804473E−15 | 4.8808138E−16 | 1.3839733E−18 | 4.8452808E−19 |

Example 4

Figure 14:
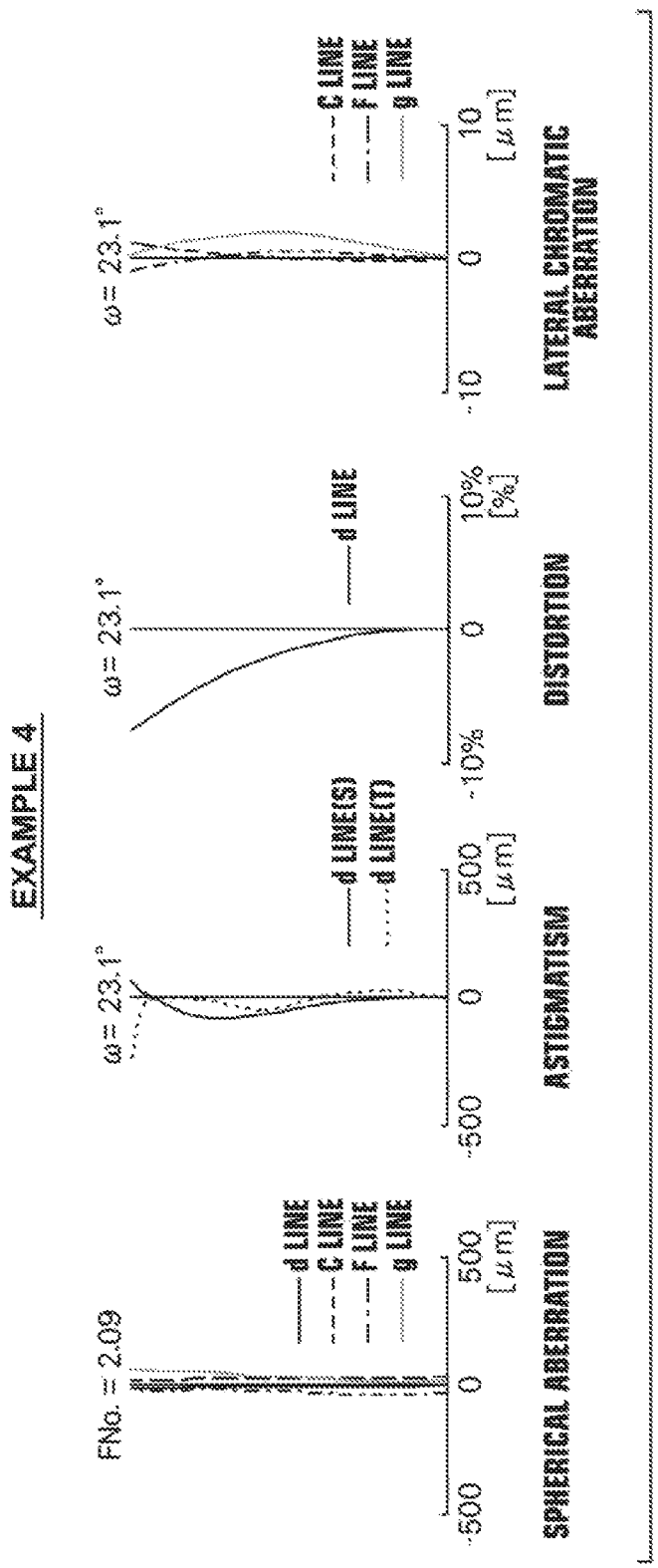
FIG. 14 is a collection of diagrams that illustrate various aberrations of the imaging lens according to Example 4, which are spherical aberration, astigmatism, distortion, and lateral chromatic aberration in this order from the left side of the drawing sheet.

The lens configuration of an imaging lens of Example 4 is illustrated in FIG. 5. In the imaging lens of Example 4, the configuration of lens groups, the constituent element that moves during focusing operations, and the direction of movement thereof are the same as those of Example 1. In the imaging lens of Example 4, the first lens group G1 is constituted by three lenses, which are, in order from the object side to the image side, lenses L11 through L13. The second lens group G2 is constituted by one lens, which is a lens L21. The third lens group G3 is constituted by five lenses, which are, in order from the object side to the image side, lenses L31 through L35. Table 7 shows basic lens data of the imaging lens of Example 4. Table 8 shows aspherical surface coefficients of the imaging lens of Example 4. Diagrams that illustrate various aberrations of the imaging lens of Example 4 in a state focused on an object at infinity are illustrated in FIG. 14.

TABLE 7

Example 4
f = 36.074, F No. = 2.09, 2ω = 47.8°

| Si | Ri | Di | Ndj | νdj |
|---|---|---|---|---|
| 1 | 50.00000 | 2.620 | 1.88300 | 40.76 |
| 2 | 226.26139 | 0.125 | | |

TABLE 7-continued

Example 4
f = 36.074, F No. = 2.09, 2ω = 47.8°

| Si | Ri | Di | Ndj | νdj |
|---|---|---|---|---|
| 3 | 27.00151 | 4.031 | 1.75500 | 52.32 |
| 4 | −963.15334 | 1.000 | 1.89286 | 20.36 |
| 5 | 83.83148 | 2.987 | | |
| 6 | ∞ | 0.825 | 1.72916 | 54.68 |
| 7 | 20.90289 | 7.745 | | |
| 8 (St) | ∞ | 4.369 | | |
| *9 | 132.64135 | 3.125 | 1.61881 | 63.85 |
| *10 | −22.55749 | 0.200 | | |
| 11 | −20.33667 | 4.510 | 1.77250 | 49.60 |
| 12 | −10.34000 | 1.060 | 1.60342 | 38.03 |
| 13 | 20.89060 | 7.750 | 1.77250 | 49.60 |
| 14 | −20.89060 | 5.520 | | |
| *15 | −15.36722 | 1.325 | 1.51633 | 64.06 |
| *16 | −249.99776 | 8.063 | | |
| 17 | ∞ | 2.850 | 1.51680 | 64.20 |
| 18 | ∞ | 1.788 | | |

TABLE 8

Example 4

| | Surface Number | | | |
|---|---|---|---|---|
| | 9 | 10 | 15 | 16 |
| KA | −4.7486860E−02 | 4.5992067E−01 | −1.6703883E+00 | 1.0635854E+01 |
| A3 | −2.2760733E−19 | 3.6454439E−17 | 0.0000000E+00 | −7.1424225E−18 |
| A4 | −2.0802349E−05 | 1.8590544E−06 | 5.7707695E−04 | 6.8477709E−04 |
| A5 | −4.3298867E−06 | 8.4841462E−05 | −6.4935563E−04 | −7.1084551E−04 |
| A6 | −5.7918884E−05 | −1.5151813E−04 | 1.4360508E−04 | 2.0464387E−04 |
| A7 | 5.5640025E−05 | 1.0379053E−04 | 1.8600240E−05 | −9.8963070E−06 |
| A8 | −2.0682261E−05 | −3.3410644E−05 | −1.0995732E−05 | −6.2909189E−06 |
| A9 | 1.4025478E−06 | 3.0330865E−06 | 5.1433688E−07 | 1.0715947E−06 |
| A10 | 1.2682209E−06 | 1.1227591E−06 | 3.2208451E−07 | 4.1489575E−08 |
| A11 | −3.3648635E−07 | −3.0739112E−07 | −3.8512188E−08 | −2.2483287E−08 |
| A12 | −4.8562607E−08 | 7.7876053E−10 | −4.3737797E−09 | 7.6389230E−10 |
| A13 | 1.2382396E−08 | 7.8282607E−09 | 8.8275348E−10 | 2.1971177E−10 |
| A14 | −1.1519757E−09 | −5.8116932E−10 | 1.8834119E−11 | −1.5875357E−11 |
| A15 | −1.5418714E−10 | −9.0666938E−11 | −1.0067855E−11 | −1.0219485E−12 |
| A16 | 2.8707759E−11 | 1.0923249E−11 | 1.8028145E−13 | 1.1535417E−13 |
| A17 | −4.6391994E−14 | 4.7095043E−13 | 5.7913664E−14 | 1.4043568E−15 |

TABLE 8-continued

Example 4

| | Surface Number | | | |
|---|---|---|---|---|
| | 9 | 10 | 15 | 16 |
| A18 | −2.1169257E−13 | −8.3446083E−14 | −2.2936538E−15 | −3.5244204E−16 |
| A19 | 9.1275014E−15 | −7.3334746E−16 | −1.3392053E−16 | 2.6137472E−18 |
| A20 | 1.0990701E−16 | 2.3426684E−16 | 7.1330757E−18 | 2.9521639E−19 |

Example 5

Figure 15:
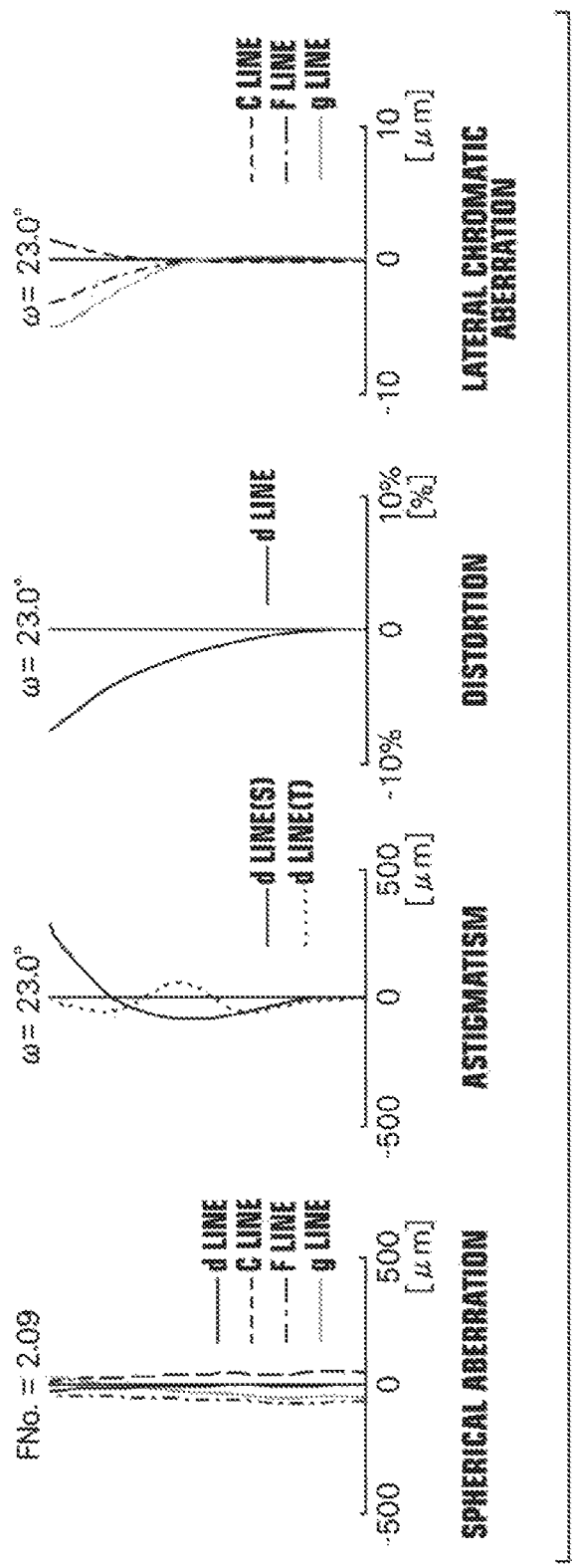
FIG. 15 is a collection of diagrams that illustrate various aberrations of the imaging lens according to Example 5, which are spherical aberration, astigmatism, distortion, and lateral chromatic aberration in this order from the left side of the drawing sheet.

The lens configuration of an imaging lens of Example 5 is illustrated in FIG. 6. In the imaging lens of Example 5, the configuration of lens groups, the constituent element that moves during focusing operations, and the direction of movement thereof are the same as those of Example 1. In the imaging lens of Example 5, the first lens group G1 is constituted by three lenses, which are, in order from the object side to the image side, lenses L11 through L13. The second lens group G2 is constituted by one lens, which is a lens L21. The third lens group G3 is constituted by five lenses, which are, in order from the object side to the image side, lenses L31 through L35. Table 9 shows basic lens data of the imaging lens of Example 5. Table 10 shows aspherical surface coefficients of the imaging lens of Example 5. Diagrams that illustrate various aberrations of the imaging lens of Example 5 in a state focused on an object at infinity are illustrated in FIG. 15.

TABLE 9

Example 5
f = 36.267, F No. = 2.09, 2ω = 46.0°

| Si | Ri | Di | Ndj | νdj |
|---|---|---|---|---|
| 1 | 47.89272 | 2.750 | 1.88300 | 40.76 |
| 2 | 187.96992 | 0.100 | | |

TABLE 9-continued

Example 5
f = 36.267, F No. = 2.09, 2ω = 46.0°

| Si | Ri | Di | Ndj | νdj |
|---|---|---|---|---|
| 3 | 26.01558 | 4.135 | 1.75500 | 52.32 |
| 4 | −609.75609 | 1.551 | 1.89286 | 20.36 |
| 5 | 89.28571 | 3.543 | | |
| 6 | −125.00000 | 0.800 | 1.75500 | 52.32 |
| 7 | 18.96981 | 5.772 | | |
| 8 (St) | ∞ | 4.780 | | |
| *9 | 61.55661 | 3.125 | 1.61881 | 63.85 |
| *10 | −30.91112 | 0.216 | | |
| 11 | −37.61021 | 4.385 | 1.77250 | 49.60 |
| 12 | −11.38591 | 0.860 | 1.60342 | 38.03 |
| 13 | 27.78179 | 6.012 | 1.77250 | 49.60 |
| 14 | −27.78179 | 5.525 | | |
| *15 | −14.20456 | 1.350 | 1.51633 | 64.06 |
| *16 | −50.66726 | 8.877 | | |
| 17 | ∞ | 2.850 | 1.51680 | 64.20 |
| 18 | ∞ | 1.788 | | |

TABLE 10

Example 5

| | Surface Number | | | |
|---|---|---|---|---|
| | 9 | 10 | 15 | 16 |
| KA | −4.7486860E−02 | 4.5992067E−01 | −1.6703883E+00 | 1.0635854E+01 |
| A3 | 1.0115006E−18 | 7.4014868E−18 | −2.9240442E−18 | −5.8480884E−18 |
| A4 | −1.3165124E−04 | −1.0591723E−04 | 1.5654574E−05 | 2.2881974E−04 |
| A5 | 1.9864048E−04 | 2.7139082E−04 | 2.1066661E−04 | 5.0544435E−05 |
| A6 | −1.5592018E−04 | −2.8360138E−04 | −9.2741652E−05 | −3.3960467E−05 |
| A7 | 5.0969227E−05 | 1.4382447E−04 | 1.1173554E−05 | 7.1920359E−06 |
| A8 | −3.7901890E−06 | −3.2893345E−05 | 2.0039629E−06 | −5.9870083E−07 |
| A9 | −1.5179938E−06 | −2.8480353E−07 | −6.6806357E−07 | −1.0519012E−07 |
| A10 | 2.5889922E−07 | 1.6919426E−06 | 2.2249742E−08 | 3.3951885E−08 |
| A11 | −2.1719047E−08 | −2.2945813E−07 | 1.2104470E−08 | −1.4624426E−09 |
| A12 | 1.6925321E−08 | −2.9769481E−08 | −1.3857419E−09 | −5.7559375E−10 |
| A13 | −1.9875429E−09 | 8.4684337E−09 | −5.8478600E−11 | 6.9003672E−11 |
| A14 | −9.1466118E−10 | 8.2910612E−11 | 1.9301318E−11 | 3.4009720E−12 |
| A15 | 1.8614035E−10 | −1.4963737E−10 | −7.8989253E−13 | −8.9320518E−13 |
| A16 | 8.8499641E−12 | 5.1515639E−12 | −9.3856176E−14 | 1.0615972E−14 |
| A17 | −4.1551719E−12 | 1.4242084E−12 | 1.0595178E−14 | 4.9447358E−15 |
| A18 | 1.2984530E−13 | −8.5006961E−14 | −8.4857606E−17 | −1.8698012E−16 |
| A19 | 2.9156959E−14 | −5.8470074E−15 | −3.5453016E−17 | −1.0053299E−17 |
| A20 | −1.8838649E−15 | 4.4741056E−16 | 1.4314625E−18 | 5.2516586E−19 |

Example 6

Figure 16:
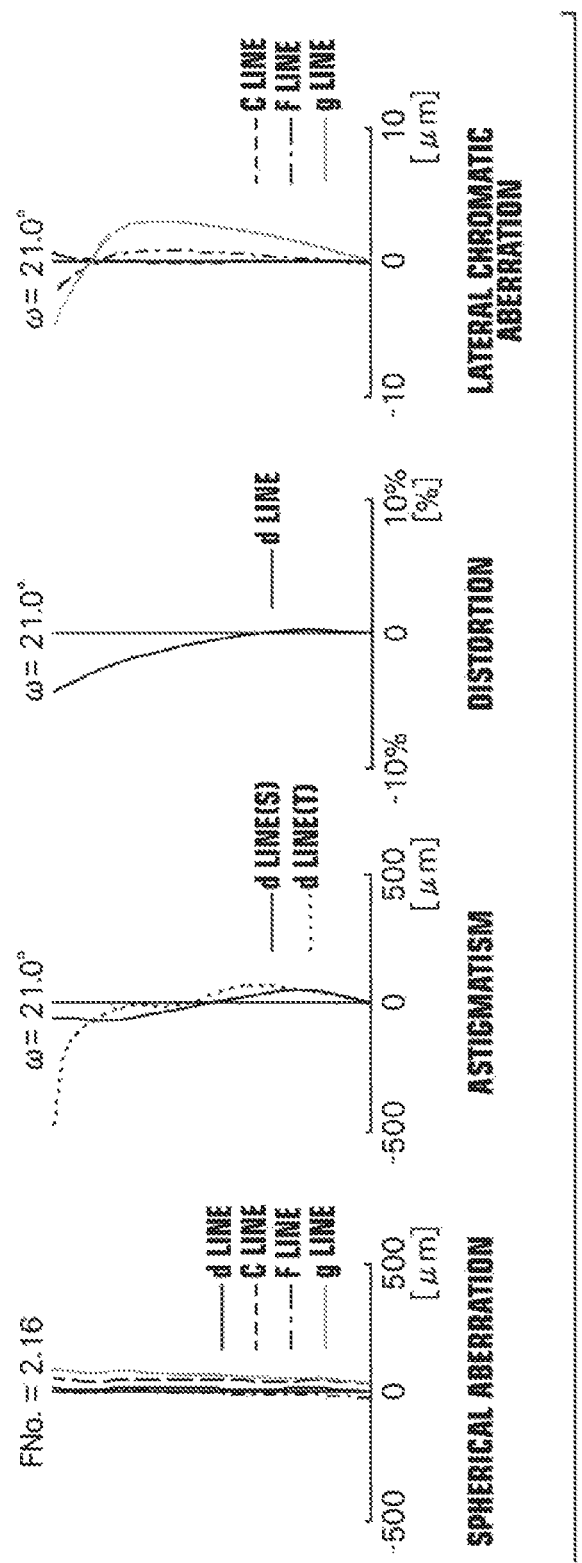
FIG. 16 is a collection of diagrams that illustrate various aberrations of the imaging lens according to Example 6, which are spherical aberration, astigmatism, distortion, and lateral chromatic aberration in this order from the left side of the drawing sheet.

The lens configuration of an imaging lens of Example 6 is illustrated in FIG. 7. In the imaging lens of Example 6, the configuration of lens groups, the constituent element that moves during focusing operations, and the direction of movement thereof are the same as those of Example 1. In the imaging lens of Example 6, the first lens group G1 is constituted by three lenses, which are, in order from the object side to the image side, lenses L11 through L13. The second lens group G2 is constituted by one lens, which is a lens L21. The third lens group G3 is constituted by five lenses, which are, in order from the object side to the image side, lenses L31 through L35. Table 11 shows basic lens data of the imaging lens of Example 6. Table 12 shows aspherical surface coefficients of the imaging lens of Example 6. Diagrams that illustrate various aberrations of the imaging lens of Example 6 in a state focused on an object at infinity are illustrated in FIG. 16.

Example 7

Figure 17:
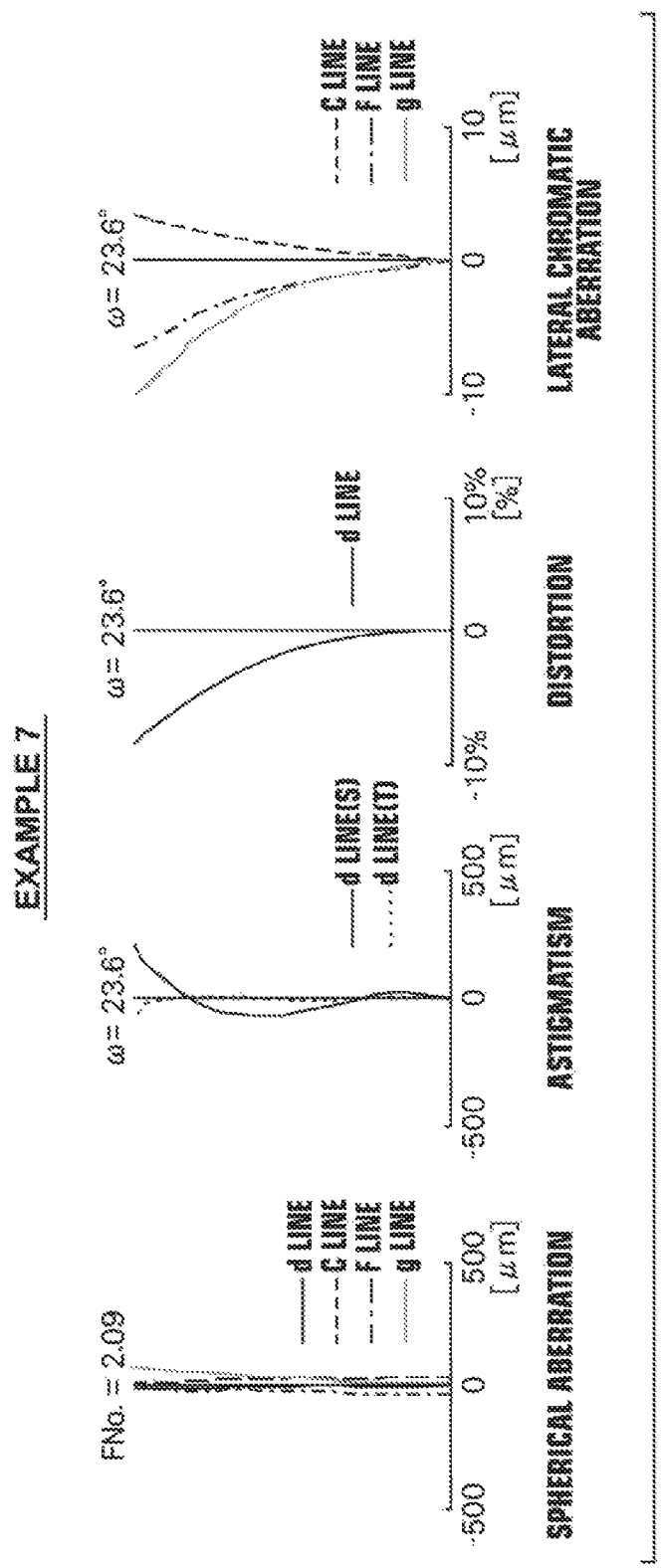
FIG. 17 is a collection of diagrams that illustrate various aberrations of the imaging lens according to Example 7, which are spherical aberration, astigmatism, distortion, and lateral chromatic aberration in this order from the left side of the drawing sheet.

The lens configuration of an imaging lens of Example 7 is illustrated in FIG. 8. In the imaging lens of Example 7, the configuration of lens groups, the constituent element that moves during focusing operations, and the direction of movement thereof are the same as those of Example 1. In the imaging lens of Example 7, the first lens group G1 is constituted by three lenses, which are, in order from the object side to the image side, lenses L11 through L13. The second lens group G2 is constituted by one lens, which is a lens L21. The third lens group G3 is constituted by five lenses, which are, in order from the object side to the image side, lenses L31 through L35. Table 13 shows basic lens data of the imaging lens of Example 7. Table 14 shows aspherical surface coefficients of the imaging lens of Example 7. Diagrams that illustrate various aberrations of the imaging lens of Example 7 in a state focused on an object at infinity are illustrated in FIG. 17.

TABLE 11

Example 6
f = 38.656, F No. = 2.16, 2ω = 43.6°

| Si | Ri | Di | Ndj | νdj |
|---|---|---|---|---|
| 1 | 49.99961 | 2.550 | 1.88300 | 40.76 |
| 2 | 152.86689 | 0.125 | | |
| 3 | 31.02574 | 4.010 | 1.75500 | 52.32 |
| 4 | −382.78662 | 1.000 | 1.89286 | 20.36 |
| 5 | 96.61837 | 2.871 | | |
| 6 | 123.55210 | 0.825 | 1.72916 | 54.68 |
| 7 | 27.77747 | 10.386 | | |
| 8 (St) | ∞ | 4.093 | | |
| *9 | −61.67046 | 2.649 | 1.61881 | 63.85 |
| *10 | −26.67331 | 0.200 | | |
| 11 | −24.96065 | 4.510 | 1.77250 | 49.60 |
| 12 | −10.33061 | 1.060 | 1.60342 | 38.03 |
| 13 | 19.99604 | 7.750 | 1.77250 | 49.60 |
| 14 | −19.99666 | 5.520 | | |
| *15 | −15.86251 | 1.325 | 1.51633 | 64.06 |
| *16 | −249.99776 | 8.050 | | |
| 17 | ∞ | 2.850 | 1.51680 | 64.20 |
| 18 | ∞ | 1.788 | | |

TABLE 13

Example 7
f = 35.566, F No. = 2.09, 2ω = 49.0°

| Si | Ri | Di | Ndj | νdj |
|---|---|---|---|---|
| 1 | 47.86396 | 2.750 | 1.88300 | 40.76 |
| 2 | 187.87528 | 0.100 | | |
| 3 | 26.59632 | 4.140 | 1.75500 | 52.32 |
| 4 | −612.95000 | 1.050 | 1.89286 | 20.36 |
| 5 | 89.40276 | 3.080 | | |
| 6 | −247.49764 | 0.810 | 1.74100 | 52.64 |
| 7 | 19.65838 | 7.390 | | |
| 8 (St) | ∞ | 4.430 | | |
| *9 | 70.78115 | 3.120 | 1.61644 | 63.68 |
| *10 | −25.83658 | 0.230 | | |
| 11 | −24.13413 | 4.390 | 1.77250 | 49.60 |
| 12 | −10.71200 | 0.860 | 1.60342 | 38.03 |
| 13 | 22.47200 | 7.480 | 1.77250 | 49.60 |
| 14 | −22.47200 | 5.500 | | |
| *15 | −14.20456 | 1.260 | 1.51565 | 63.12 |
| *16 | −76.47328 | 8.654 | | |
| 17 | ∞ | 2.850 | 1.51680 | 64.20 |
| 18 | ∞ | 1.788 | | |

TABLE 12

Example 6

| | Surface Number | | | |
|---|---|---|---|---|
| | 9 | 10 | 15 | 16 |
| KA | −4.7486860E−02 | 4.5992067E−01 | −1.6703883E+00 | 1.0635854E+01 |
| A3 | 1.3656440E−18 | 3.7072311E−18 | 0.0000000E+00 | −3.8053890E−18 |
| A4 | −9.2232401E−05 | 6.5185197E−06 | 6.5783777E−04 | 1.2321625E−03 |
| A5 | 4.6578346E−05 | 6.2701740E−05 | −5.9410516E−04 | −1.0047033E−03 |
| A6 | −7.6095991E−05 | −1.3726970E−04 | 9.3761464E−05 | 2.4336560E−04 |
| A7 | 5.5205671E−05 | 1.0203442E−04 | 2.5190967E−05 | −1.7764982E−06 |
| A8 | −1.8720673E−05 | −3.4462121E−05 | −8.7675988E−06 | −8.5865640E−06 |
| A9 | 1.0342205E−06 | 3.3297995E−06 | −8.7610764E−09 | 1.0216975E−06 |
| A10 | 1.1962840E−06 | 1.1485396E−06 | 2.8316235E−07 | 9.6173168E−08 |
| A11 | −3.0563353E−07 | −3.2291578E−07 | −2.2396999E−08 | −2.4354091E−08 |
| A12 | −4.9570785E−09 | 9.8525650E−10 | −4.2941833E−09 | 7.2589069E−11 |
| A13 | 1.1213267E−08 | 8.2491549E−09 | 6.1764997E−10 | 2.6554252E−10 |
| A14 | −1.0640885E−09 | −6.0556289E−10 | 2.6044895E−11 | −1.1225679E−11 |
| A15 | −1.3044394E−10 | −9.7020405E−11 | −7.6157040E−12 | −1.4690814E−12 |
| A16 | 2.5931141E−11 | 1.1454255E−11 | 6.8849306E−14 | 1.0208724E−13 |
| A17 | −2.9706453E−13 | 5.2166457E−13 | 4.5873075E−14 | 3.5020030E−15 |
| A18 | −1.7462708E−13 | −8.8520926E−14 | −1.6077058E−15 | −3.6092739E−16 |
| A19 | 1.0209571E−14 | −9.0052370E−16 | −1.0946814E−16 | −1.2827660E−18 |
| A20 | −7.9245070E−17 | 2.5285279E−16 | 5.5497167E−18 | 3.8725216E−19 |

TABLE 14

Example 7

| | Surface Number | | | |
|---|---|---|---|---|
| | 9 | 10 | 15 | 16 |
| KA | −4.7486860E−02 | 4.5992067E−01 | −1.6703883E+00 | 1.0635854E+01 |
| A3 | −1.2643757E−18 | −1.2747005E−17 | 5.8480884E−18 | 1.7056924E−18 |
| A4 | 1.0216920E−05 | 1.4016931E−05 | 1.0770917E−05 | 3.0808419E−04 |
| A5 | 2.1864780E−05 | 1.5103804E−04 | 1.4649414E−04 | −2.7002421E−05 |
| A6 | −6.9433166E−05 | −2.2790821E−04 | −8.2786006E−05 | −3.4907325E−05 |
| A7 | 4.7723505E−05 | 1.4011375E−04 | 1.2310906E−05 | 1.1179913E−05 |
| A8 | −1.4696368E−05 | −3.8235968E−05 | 1.6308258E−06 | −5.6151194E−07 |
| A9 | 9.4009715E−07 | 1.0173002E−06 | −6.3890595E−07 | −2.5345123E−07 |
| A10 | 7.7870159E−07 | 1.8791236E−06 | 2.5697721E−08 | 3.5310434E−08 |
| A11 | −2.3390811E−07 | −3.1764370E−07 | 1.0562097E−08 | 2.0771155E−09 |
| A12 | 1.0087428E−08 | −3.0545741E−08 | −1.2976636E−09 | −6.8236066E−10 |
| A13 | 6.7459401E−09 | 1.1424148E−08 | −3.1107963E−11 | 1.8178443E−11 |
| A14 | −1.2184270E−09 | −5.0369035E−11 | 1.6643896E−11 | 5.7618289E−12 |
| A15 | −8.2238889E−12 | −2.0406393E−10 | −1.0362919E−12 | −4.7002951E−13 |
| A16 | 2.2465541E−11 | 9.1999895E−12 | −6.4890221E−14 | −1.4041500E−14 |
| A17 | −1.9027320E−12 | 1.9511880E−12 | 1.1725064E−14 | 3.0623247E−15 |
| A18 | −7.6964398E−14 | −1.3393169E−13 | −2.3337995E−16 | −6.0945939E−17 |
| A19 | 1.8482460E−14 | −7.9478221E−15 | −3.7550897E−17 | −6.5919127E−18 |
| A20 | −7.4588583E−16 | 6.6921794E−16 | 1.7303248E−18 | 2.7060223E−19 |

Example 8

Figure 18:
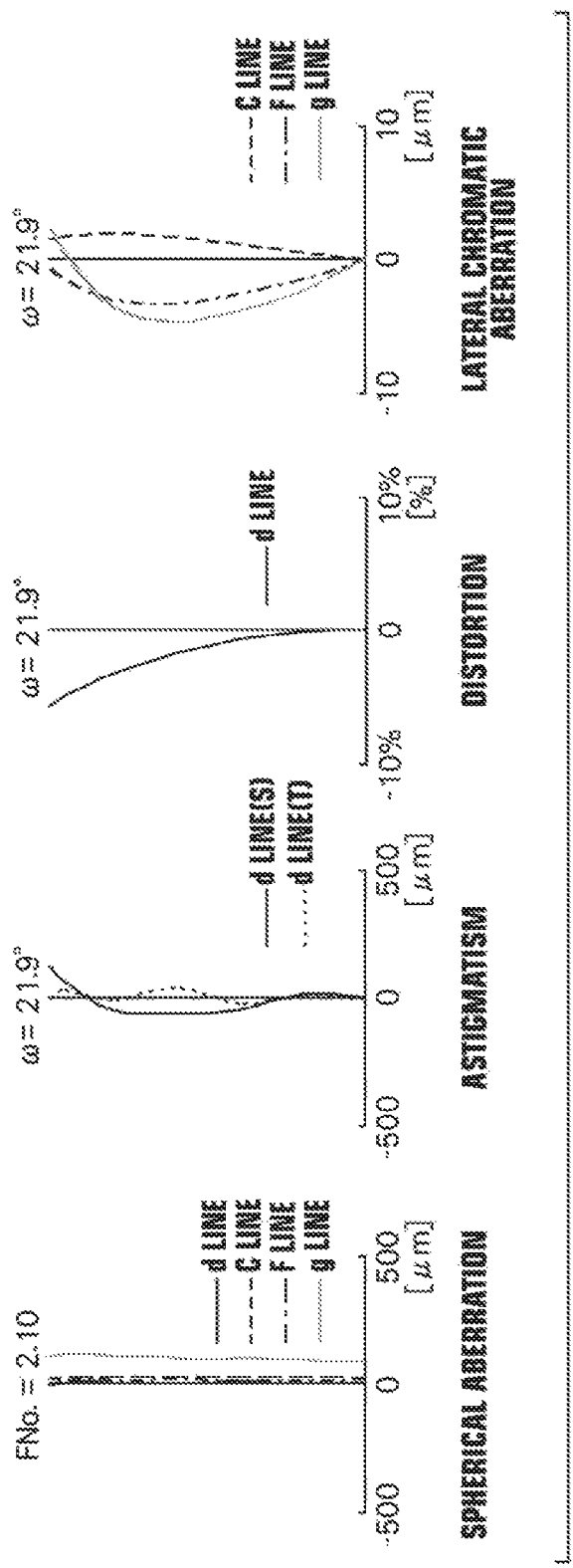
FIG. 18 is a collection of diagrams that illustrate various aberrations of the imaging lens according to Example 8, which are spherical aberration, astigmatism, distortion, and lateral chromatic aberration in this order from the left side of the drawing sheet.

The lens configuration of an imaging lens of Example 8 is illustrated in FIG. 9. In the imaging lens of Example 8, the configuration of lens groups, the constituent element that moves during focusing operations, and the direction of movement thereof are the same as those of Example 1. In the imaging lens of Example 8, the first lens group G1 is constituted by three lenses, which are, in order from the object side to the image side, lenses L11 through L13. The second lens group G2 is constituted two lenses, which are, in order from the object side to the image side, a lens L21 and a lens L22. The third lens group G3 is constituted by five lenses, which are, in order from the object side to the image side, lenses L31 through L35. Table 15 shows basic lens data of the imaging lens of Example 8. Table 16 shows aspherical surface coefficients of the imaging lens of Example 8. Diagrams that illustrate various aberrations of the imaging lens of Example 8 in a state focused on an object at infinity are illustrated in FIG. 18.

TABLE 15

Example 8
f = 37.451, F No. = 2.10, 2ω = 43.8°

| Si | Ri | Di | Ndj | vdj |
|---|---|---|---|---|
| 1 | 47.48425 | 2.550 | 1.88300 | 40.76 |
| 2 | 312.46150 | 0.100 | | |
| 3 | 28.44767 | 3.765 | 1.75500 | 52.32 |
| 4 | ∞ | 0.925 | 1.89286 | 20.36 |
| 5 | 72.90090 | 3.472 | | |
| 6 | −179.64329 | 1.010 | 1.89286 | 20.36 |
| 7 | −34.12124 | 0.800 | 1.80518 | 34.44 |
| 8 | 20.74707 | 8.210 | | |
| 9 (St) | ∞ | 3.897 | | |
| *10 | 67.25760 | 3.018 | 1.61881 | 63.85 |
| *11 | −23.69999 | 0.225 | | |
| 12 | −19.68450 | 4.385 | 1.77250 | 49.60 |
| 13 | −10.33059 | 0.860 | 1.60342 | 38.03 |
| 14 | 21.58841 | 7.318 | 1.77250 | 49.60 |
| 15 | −21.58841 | 5.512 | | |
| *16 | −14.87038 | 1.250 | 1.51633 | 64.06 |
| *17 | −63.11483 | 8.794 | | |
| 18 | ∞ | 2.850 | 1.51680 | 64.20 |
| 19 | ∞ | 4.347 | | |

TABLE 16

Example 8

| | Surface Number | | | |
|---|---|---|---|---|
| | 10 | 11 | 16 | 17 |
| KA | −4.7486860E−02 | 4.5992067E−01 | −1.6703883E+00 | 1.0635854E+01 |
| A3 | −1.2643757E−18 | −1.6447749E−18 | −1.9493628E−18 | −3.1677145E−18 |
| A4 | 1.0861366E−04 | 1.3642742E−04 | −2.5988647E−04 | −5.3853036E−06 |
| A5 | −8.4520205E−05 | −1.8315531E−05 | 2.7055432E−04 | 6.7743739E−05 |
| A6 | −4.0382583E−05 | −1.4752156E−04 | −1.1145064E−04 | −2.2873322E−05 |
| A7 | 5.4862691E−05 | 1.3194725E−04 | 1.3088787E−05 | 2.2238254E−08 |
| A8 | −1.8548288E−05 | −4.3615088E−05 | 2.9935587E−06 | 9.7674643E−07 |
| A9 | 7.1904074E−07 | 2.5432606E−06 | −8.8653431E−07 | −3.6780663E−08 |

TABLE 16-continued

Example 8

| | Surface Number | | | |
|---|---|---|---|---|
| | 10 | 11 | 16 | 17 |
| A10 | 1.0273036E−06 | 1.9712946E−06 | 7.4595429E−09 | −3.5471226E−08 |
| A11 | −2.3209762E−07 | −3.9405340E−07 | 1.8805937E−08 | 3.4859011E−09 |
| A12 | 2.3263051E−10 | −2.7268032E−08 | −1.4435296E−09 | 5.0526092E−10 |
| A13 | 6.8268980E−09 | 1.3302310E−08 | −1.6166339E−10 | −7.5632122E−11 |
| A14 | −9.6610597E−10 | −2.2666293E−10 | 2.3633113E−11 | −2.8646862E−12 |
| A15 | −1.0773819E−11 | −2.2810670E−10 | 8.1183899E−14 | 7.4735610E−13 |
| A16 | 1.8361776E−11 | 1.2408057E−11 | −1.4708306E−13 | −5.0485949E−16 |
| A17 | −1.8742444E−12 | 2.0954418E−12 | 6.7434703E−15 | −3.7482821E−15 |
| A18 | −3.8276120E−14 | −1.6023227E−13 | 1.9896247E−16 | 8.0824288E−17 |
| A19 | 1.8367683E−14 | −8.2114748E−15 | −2.8463452E−17 | 7.8332297E−18 |
| A20 | −9.0674763E−16 | 7.4848916E−16 | 8.5380305E−19 | −2.7825060E−19 |

Example 9

Figure 19:
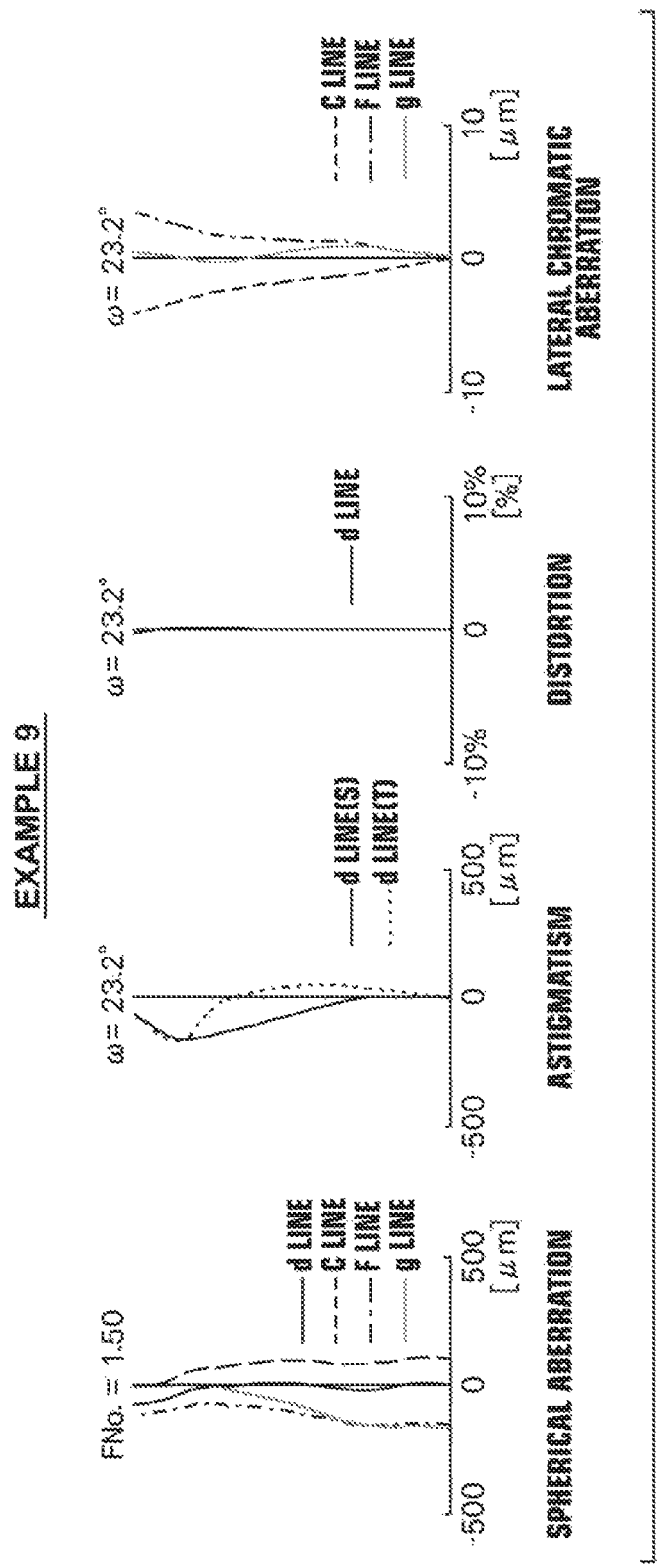
FIG. 19 is a collection of diagrams that illustrate various aberrations of the imaging lens according to Example 9, which are spherical aberration, astigmatism, distortion, and lateral chromatic aberration in this order from the left side of the drawing sheet.

The lens configuration of an imaging lens of Example 9 is illustrated in FIG. 10. In the imaging lens of Example 9, the configuration of lens groups is the same as that of Example 1. However, when changing focus from that on an object at infinity to that on an object at a proximal distance, the first lens group G1 and the third lens group G3 are fixed with respect to an image formation plane Sim, while the second lens group G2 and the aperture stop St move integrally from the object side to the image side. In the imaging lens of Example 9, the first lens group G1 is constituted by three lenses, which are, in order from the object side to the image side, lenses L11 through L13. The second lens group G2 is constituted by two lenses, which are, in order from the object side to the image side, a lens L21 and a lens L22. The third lens group G3 is constituted by four lenses, which are, in order from the object side to the image side, lenses L31 through L34. Table 17 shows basic lens data of the imaging lens of Example 9. Table 18 shows aspherical surface coefficients of the imaging lens of Example 9. Diagrams that illustrate various aberrations of the imaging lens of Example 9 in a state focused on an object at infinity are illustrated in FIG. 19.

TABLE 17

Example 9
f = 50.483, F No. = 1.50, 2ω = 46.4°

| Si | Ri | Di | Ndj | νdj |
|---|---|---|---|---|
| 1 | 49.71764 | 5.685 | 1.81463 | 46.54 |
| 2 | 780.64228 | 0.198 | | |
| 3 | 32.19017 | 4.858 | 1.88156 | 39.84 |
| 4 | 201.15044 | 1.610 | 1.99840 | 15.08 |
| 5 | 48.41798 | 0.800 | | |
| *6 | 41.18038 | 4.327 | 1.99834 | 27.84 |
| 7 | −73.05426 | 1.099 | 1.87408 | 40.59 |
| *8 | 16.96746 | 3.749 | | |
| 9 (St) | ∞ | 10.560 | | |
| *10 | −201.54555 | 2.000 | 1.85770 | 42.23 |
| *11 | −57.64670 | 2.919 | | |
| 12 | −41.14416 | 1.113 | 1.99840 | 15.08 |
| 13 | −70.07454 | 6.715 | 1.82600 | 44.70 |
| 14 | −20.22356 | 7.696 | | |
| *15 | −46.15909 | 1.118 | 1.53180 | 49.04 |
| *16 | 94.00364 | 10.000 | | |
| 17 | ∞ | 1.000 | 1.51680 | 64.20 |
| 18 | ∞ | 0.356 | | |

TABLE 18

Example 9

| | Surface Number | | | |
|---|---|---|---|---|
| | 6 | 8 | 10 | 11 |
| KA | 0.0000000E+00 | 0.0000000E+00 | 0.0000000E+00 | 0.0000000E+00 |
| A3 | 5.1869767E−05 | −8.5440500E−05 | −1.0921228E−04 | 2.4166378E−04 |
| A4 | −7.8956674E−05 | 2.0807671E−05 | 3.9984210E−05 | −1.7720883E−04 |
| A5 | 2.3016532E−05 | −2.3989883E−05 | −1.5626495E−05 | 6.6272019E−05 |
| A6 | −4.4421512E−06 | 7.1870990E−06 | 1.0649080E−06 | −8.1193847E−06 |
| A7 | 1.3604646E−07 | −6.5549236E−07 | 3.2293344E−07 | −1.8338080E−06 |
| A8 | 9.9553381E−08 | −2.2650437E−07 | −9.3716283E−08 | 6.9473873E−07 |
| A9 | −1.4587380E−08 | 6.6573967E−08 | 6.8469825E−09 | −4.4519697E−08 |
| A10 | −3.0724857E−10 | −2.4225115E−09 | 1.1345536E−09 | −1.1477865E−08 |
| A11 | 2.1895698E−10 | −1.2432640E−09 | −1.9549545E−10 | 1.8832061E−09 |
| A12 | −1.0359320E−11 | 1.4498360E−10 | −2.0532091E−11 | 3.9470065E−11 |
| A13 | −1.4428703E−12 | 8.7073271E−12 | 6.4082437E−12 | −2.9747899E−11 |
| A14 | 1.6016926E−13 | −2.4211028E−12 | −3.3737822E−13 | 2.1051046E−12 |
| A15 | −7.4172266E−16 | 8.1601432E−14 | −1.9271037E−14 | 4.8231936E−14 |
| A16 | −5.5913302E−16 | 1.0631337E−14 | 1.1325035E−15 | −1.1192312E−14 |
| A17 | 1.9454278E−17 | −7.8256586E−16 | 1.5231540E−16 | 1.3318003E−16 |
| A18 | 7.3763490E−19 | −1.2747925E−17 | −9.7157907E−18 | 3.9153783E−17 |

TABLE 18-continued

Example 9

| | | | | |
|---|---|---|---|---|
| A19 | −5.5861577E−20 | 2.5434546E−18 | −1.5747975E−19 | −2.2251175E−18 |
| A20 | 9.2301389E−22 | −6.2802457E−20 | 1.4697522E−20 | 3.8131295E−20 |

| | Surface Number | |
|---|---|---|
| | 15 | 16 |
| KA | 0.0000000E+00 | 0.0000000E+00 |
| A3 | 3.0888566E−04 | −1.6143150E−04 |
| A4 | −4.5710773E−04 | −3.0015911E−04 |
| A5 | 1.9013688E−05 | −4.3648178E−06 |
| A6 | 7.3136250E−06 | 6.3091741E−06 |
| A7 | −6.5407456E−07 | −8.6768829E−08 |
| A8 | −6.3703774E−08 | −9.3933119E−08 |
| A9 | 1.0125826E−08 | 5.1674546E−09 |
| A10 | 1.8040675E−10 | 6.8233299E−10 |
| A11 | −8.1676822E−11 | −6.2294647E−11 |
| A12 | 1.1284465E−12 | −2.3017757E−12 |
| A13 | 3.7997515E−13 | 3.6248768E−13 |
| A14 | −1.1514207E−14 | 9.9601072E−16 |
| A15 | −1.0330674E−15 | −1.1351374E−15 |
| A16 | 4.1657998E−17 | 1.6142360E−17 |
| A17 | 1.5217216E−18 | 1.8499416E−18 |
| A18 | −7.1479153E−20 | −4.4847402E−20 |
| A19 | −9.4385680E−22 | −1.2269224E−21 |
| A20 | 4.8747436E−23 | 3.7700645E−23 |

Table 19 shows values corresponding to Conditional Formulae (1) through (7) for the imaging lenses of Examples 1 through 9. The values shown in Table 19 are those with respect to the d line. In addition, Table 19 also shows the refractive indices of the negative lens and the positive lens that form the cemented lenses within the first lens group G1 of each of Examples 1 through 9 as Nd1n and Nd1p, respectively. In all of the examples, Nd1n>Nd1p.

interchangeably mounted. The exchangeable lens 20 is a lens barrel having an imaging lens 1 according to an embodiment of the present disclosure housed therein.

The camera 30 is equipped with a camera body 31. A shutter release button 32 and a power button 33 are provided on the upper surface of the camera body 31. Operating sections 34 and 35 and a display section 36 are provided on the rear surface of the camera body 31. The display section

TABLE 19

| Formula | | Example 1 | Example 2 | Example 3 | Example 4 | Example 5 | Example 6 | Example 7 | Example 8 | Example 9 |
|---|---|---|---|---|---|---|---|---|---|---|
| (1) | ν1p−ν1n | 32.960 | 29.150 | 31.960 | 31.960 | 31.960 | 31.960 | 31.960 | 31.960 | 24.760 |
| | Nd1n | 1.89286 | 1.95906 | 1.89286 | 1.89286 | 1.89286 | 1.89286 | 1.89286 | 1.89286 | 1.99840 |
| | Nd1p | 1.75500 | 1.81600 | 1.75500 | 1.75500 | 1.75500 | 1.75500 | 1.75500 | 1.75500 | 1.88156 |
| (2) | f/fe | −1.090 | −0.648 | −0.627 | −1.135 | −0.937 | −1.176 | −1.044 | −0.985 | −0.870 |
| (3) | ν3p−ν3n | 11.570 | 13.580 | 11.570 | 11.570 | 11.570 | 11.570 | 11.570 | 11.570 | 29.620 |
| (4) | f/f2 | −0.860 | −1.169 | −2.081 | −1.258 | −1.000 | −0.784 | −1.449 | −1.548 | −1.119 |
| (5) | Ra/f3 | −0.535 | −0.588 | −1.551 | −0.686 | −1.061 | −0.496 | −0.814 | −0.778 | −0.401 |
| (6) | f/f1 | 1.088 | 1.194 | 1.272 | 1.148 | 1.214 | 1.057 | 1.165 | 1.165 | 1.271 |
| (7) | Bf/f | 0.353 | 0.363 | 0.344 | 0.325 | 0.346 | 0.303 | 0.346 | 0.401 | 0.218 |

As can be understood from the data above, the imaging lenses of Examples 1 through 9 are configured to be compact, with the values of TL/f thereof being within a range from 1.2 to 1.67, and have wide angles of view with full angles of view of 42° or greater. The imaging lenses of Examples 1 through 9 have focusing lens groups constituted by one or two lenses, and therefore weight reduction of the focusing lens groups is enabled. Further, chromatic aberrations are favorably corrected, and high optical performance is realized.

Figure 20A:
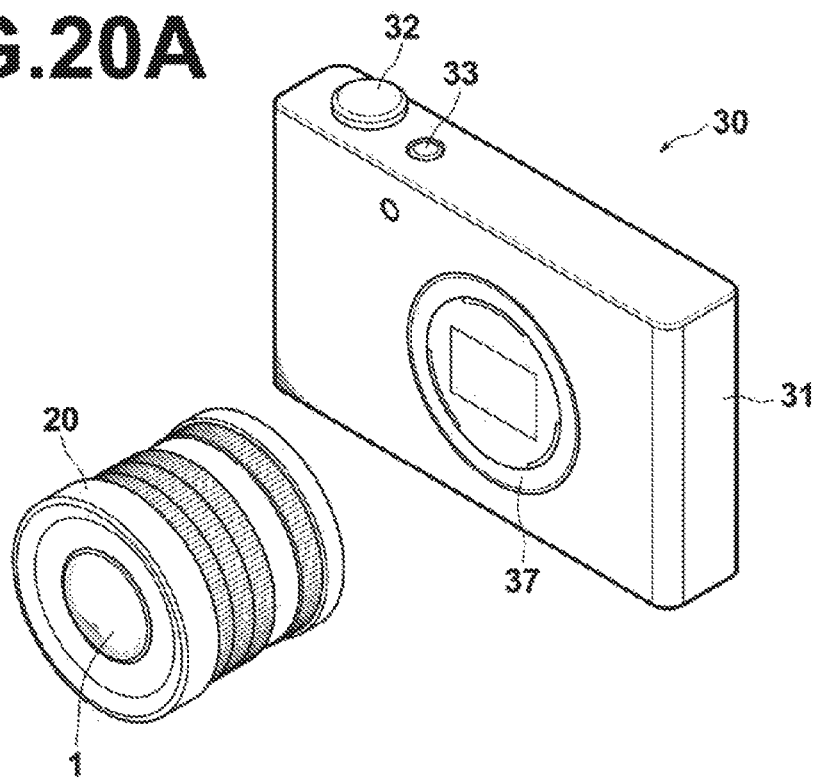
FIG. 20A is a perspective view that illustrates the front side of an imaging apparatus according to an embodiment of the present disclosure.
Figure 20B:
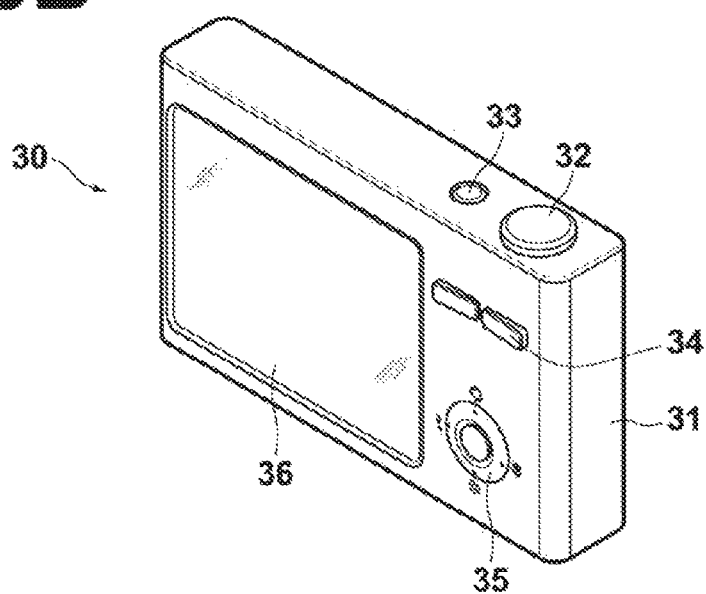
FIG. 20B is a perspective view that illustrates the rear side of an imaging apparatus according to an embodiment of the present disclosure.

Next, an imaging apparatus according to an embodiment of the present disclosure will be described. FIG. 20A and FIG. 20B illustrate the outer appearance of a camera 30 as an imaging apparatus according to an embodiment of the present disclosure. FIG. 20A is a perspective view of the camera 30 as viewed from the front, and FIG. 20B is a perspective view of the camera 30 as viewed from the rear. The camera 30 is a single lens digital camera which does not have a reflex finder, onto which an exchangeable lens 20 is 36 displays images which have been photographed and images within the angle of view prior to photography.

A photography opening, in to which light from targets of photography enters, is provided at the central portion of the front surface of the camera body 31. A mount 37 is provided at a position corresponding to the photography opening. The exchangeable lens 20 is mounted onto the camera body 31 via the mount 37.

An imaging element (not shown), such as a CCD (Charge Coupled Device) and a CMOS (Complementary Metal Oxide Semiconductor) that receives images of subjects formed by the exchangeable lens 20 and outputs image signals corresponding to the images, a signal processing circuit (not shown) that processes the image signals output by the imaging element to generate images, and a recording medium (not shown) for recording the generated images, are provided within the camera body 31. In this camera 30, photography of still images and videos is enabled by pressing the shutter release button 32. Image data obtained by photography or video imaging are recorded in the recording medium.

By applying the imaging lens of the present disclosure as the interchangeable lens 20 for use in such a camera 30, a compact configuration, photography with a wide angle of view, high speed focusing operations, and obtainment of favorable images become possible.

The present disclosure has been described with reference to the embodiments and Examples thereof. However, the present disclosure is not limited to the embodiments and Examples described above, and various modifications are possible. For example, the values of the radii of curvature, the distances among surfaces, the refractive indices, the Abbe's numbers, the aspherical surface coefficients, etc. of each lens are not limited to the numerical values indicated in connection with the Examples, and may be other values.

In addition, the embodiment of the imaging apparatus was described with reference to the drawings as a single lens digital camera without a reflex finder. However, the present disclosure is not limited to this application. For example, the imaging lens of the present disclosure may be applied to a single lens reflex camera, a film camera, a video camera, etc.

What is claimed is:

1. An imaging lens consisting of, in order from the object side to the image side:
   a first lens group having a positive refractive power;
   a second lens group having a negative refractive power; and
   a third lens group having a positive refractive power;
   the first lens group and the third lens group being fixed with respect to an image formation plane and the second lens group moving from the object side to the image side during focusing operations to change focus from that on an object at infinity to that on an object at a proximal distance;
   the first lens group having at least one cemented lens constituted by two lenses, formed by cementing a positive lens and a negative lens together;
   the second lens group consisting of two or fewer lenses;
   the third lens group consisting of three or more lenses;
   the surface toward the object side of at least one of the lens provided most toward the object side within the third lens group and the lens provided second from the object side within the third lens group being concave;
   the lens provided most toward the image side within the third lens group being a negative lens having a concave surface toward the object side; and
   Conditional Formula (1) below related to at least one cemented lens constituted by two lenses within the first lens group being satisfied:

$$20 < v1p - v1n \quad (1)$$

wherein v1p is the Abbe's number with respect to the d line of a positive lens within the cemented lens constituted by two lenses, and v1n is the Abbe's number with respect to the d line of a negative lens within the cemented lens constituted by two lenses.

2. An imaging lens as defined in claim 1, wherein:
   the first lens group has a positive negative cemented lens, in which a positive lens and a negative lens, provided in this order from the object side to the image side, are cemented together.

3. An imaging lens as defined in claim 2, wherein:
   the refractive index with respect to the d line of the negative lens within the positive negative cemented lens is greater than the refractive index with respect to the d line of the positive lens within the positive negative cemented lens.

4. An imaging lens as defined in claim 1, wherein:
   the third lens group has a cemented lens formed by cementing at least one positive lens and at least one negative lens together.

5. An imaging lens as defined in claim 1, wherein:
   an aperture stop is positioned between a lens surface most toward the image side within the second lens group and a lens surface most toward the object side within the third lens group.

6. An imaging lens as defined in claim 1, in which Conditional Formula (2) below is satisfied:

$$-1.5 < f/fe < -0.4 \quad (2)$$

wherein f is the focal length of the entire lens system in a state focused on an object at infinity, and fe is the focal length of the lens provided most toward the image side.

7. An imaging lens as defined in claim 1, wherein:
   the surface toward the image side of the lens provided most toward the image side is of an aspherical shape having a positive refractive power in the vicinity of the optical axis and a stronger positive refractive power at the intersection of a principal light ray at a maximum angle of view and the surface, or is of an aspherical shape having a negative refractive power in the vicinity of the optical axis and a positive refractive power at the intersection of a principal light ray at a maximum angle of view and the surface.

8. An imaging lens as defined in claim 1, wherein:
   the first lens group consists of, in order from the object side to the image side:
   two positive lenses; and
   one negative lens.

9. An imaging lens as defined in claim 1, wherein:
   the third lens group consists of, in order from the object side to the image side, a positive lens, a negative lens, a positive lens, and a negative lens, or consists of, in order from the object side to the image side, a positive lens, a positive lens, a negative lens, a positive lens, and a negative lens; and
   the second and third lenses from the image side within the third lens group are cemented together.

10. An imaging lens as defined in claim 1, wherein:
    the third lens group has a cemented lens formed by cementing at least one positive lens and at least one negative lens together; and
    Conditional Formula (3) below, related to at least one cemented lens within the third lens group is satisfied:

$$10 < v3p - v3n \quad (3)$$

wherein v3p is the maximum Abbe's number with respect to the d line of a positive lens within the cemented lens, and v3n is the minimum Abbe's number with respect to the d line of a negative lens within the cemented lens.

11. An imaging lens as defined in claim 1, in which Conditional Formula (4) below is satisfied:

$$-3.0 < f/f2 < -0.6 \quad (4)$$

wherein f is the focal length of the entire lens system in a state focused on an object at infinity, and f2 is the focal length of the second lens group.

12. An imaging lens as defined in claim 1, in which Conditional Formula (5) below is satisfied:

$$-2.0 < Ra/f3 < -0.3 \quad (5)$$

wherein Ra is the radius of curvature of the surface toward the image side of the second lens from the image side within the third lens group, and f3 is the focal length of the third lens group.

13. An imaging lens as defined in claim 1, in which Conditional Formula (6) below is satisfied:

$$0.9 < f/f1 < 1.4 \quad (6)$$

wherein f is the focal length of the entire lens system in a state focused on an object at infinity, and f1 is the focal length of the first lens group.

14. An imaging lens as defined in claim 1, in which Conditional Formula (7) below is satisfied:

$$0.2 < Bf/f < 0.5 \quad (7)$$

wherein Bf is an air converted distance along the optical axis from the lens surface most toward the image side to an image formation plane, and f is the focal length of the entire lens system in a state focused on an object at infinity.

15. An imaging lens as defined in claim 1, in which Conditional Formula (1-1) below is satisfied:

$$23 < v1p - v1n \quad (1\text{-}1).$$

16. An imaging lens as defined in claim 6, in which Conditional Formula (2-1) below is satisfied:

$$-1.3 < f/fe < -0.6 \quad (2\text{-}1).$$

17. An imaging lens as defined in claim 11, in which Conditional Formula (4-1) below is satisfied:

$$-2.2 < f/f2 < -0.6 \quad (4\text{-}1).$$

18. An imaging lens as defined in claim 12, in which Conditional Formula (5-1) below is satisfied:

$$-1.6 < Ra/f3 < -0.3 \quad (5\text{-}1).$$

19. An imaging lens as defined in claim 13, in which Conditional Formula (6-1) below is satisfied:

$$1.0 < f/f1 < 1.3 \quad (6\text{-}1).$$

20. An imaging apparatus equipped with an image lens as defined in claim 1.

* * * * *